US006630958B2

(12) United States Patent
Tanaka et al.

(10) Patent No.: US 6,630,958 B2
(45) Date of Patent: Oct. 7, 2003

(54) METHOD AND APPARATUS FOR STORING AND DISPLAYING AN IMAGE TAKEN BY A ROTATABLE IMAGE PICKUP PORTION

(75) Inventors: Toshiyuki Tanaka, Sakai (JP); Hirokazu Yagura, Sakai (JP); Toshihito Kido, Matsubara (JP); Manabu Inoue, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/003,793

(22) Filed: Jan. 7, 1998

(65) Prior Publication Data

US 2002/0191096 A1 Dec. 19, 2002

(30) Foreign Application Priority Data

Jan. 7, 1997 (JP) ............................................. 9-000957

(51) Int. Cl.[7] ............................................. H04N 5/222
(52) U.S. Cl. ............................. 348/333.06; 348/333.07; 348/333.05
(58) Field of Search ....................... 348/333.06, 333.01, 348/333.02, 333.05, 333.07, 333.08, 333.11, 333.12, 334, 373, 374, 375, 233, 207, 14.01, 207.99, 231.3; 386/118; 396/373, 374, 378, 381, 301, 56, 277; 358/906, 909.1

(56) References Cited

U.S. PATENT DOCUMENTS

| 4,757,388 | A | | 7/1988 | Someya et al. | |
|---|---|---|---|---|---|
| 4,928,300 | A | * | 5/1990 | Ogawa et al. | 348/14.01 |
| 5,164,831 | A | * | 11/1992 | Kuchta et al. | 348/233 |
| 5,442,453 | A | * | 8/1995 | Takagi et al. | 386/118 |
| 5,559,554 | A | * | 9/1996 | Uekane et al. | 348/333.02 |
| 6,118,485 | A | * | 9/2000 | Hinoue et al. | 348/373 |
| 6,215,524 | B1 | * | 4/2001 | Shiozaki | 348/376 |

* cited by examiner

Primary Examiner—Aung S. Moe
(74) Attorney, Agent, or Firm—Sidley Austin Brown & Wood LLP

(57) ABSTRACT

A digital camera 1 includes a main body 2 and an image pickup section 3 connected to the main body rotatably. The main body 2 has a display monitor 10 which displays an object picture. A switch SCPOS2 detects rotation position of the image pickup section 3. When the image pickup direction of the image pickup section 3 is detected to agree generally with the direction to the side of display monitor, the image data taken by the image pickup section is displayed in the display monitor with reversal upside down, while it is recorded without reversal in an IC card 35. Thus, when a photographer takes a picture thereof, the picture can be taken and recorded at a fast speed without a complicated and expensive circuit.

11 Claims, 24 Drawing Sheets

Fig.12

SS table

| Change strage time(sec) | Gain |
|---|---|
| 1/1024 | Low |
| 1/912 | Low |
| 1/812 | Low |
| 1/724 | Low |
| 1/645 | Low |
| 1/575 | Low |
| 1/512 | Low |
| 1/456 | Low |
| 1/406 | Low |
| 1/362 | Low |
| 1/322 | Low |
| 1/287 | Low |
| 1/256 | Low |
| 1/228 | Low |
| 1/203 | Low |
| 1/181 | Low |
| 1/161 | Low |
| 1/144 | Low |
| 1/128 | Low |
| 1/114 | Low |
| 1/102 | Low |
| 1/91 | Low |
| 1/81 | Low |
| 1/72 | Low |
| 1/64 | Low |
| 1/57 | Low |
| 1/51 | Low |
| 1/45 | Low |
| 1/40 | Low |
| 1/36 | Low |
| 1/32 | Low |
| 1/30 | Low |
| 1/30 | High |
| 1/15 | Low |
| 1/15 | High |
| 1/10 | Low |
| 1/10 | High |

Over (High speed)
↑
Initial set value
↓
Under (Low speed)

METHOD AND APPARATUS FOR STORING AND DISPLAYING AN IMAGE TAKEN BY A ROTATABLE IMAGE PICKUP PORTION

BACKGROUND OF THE INVENTION

1. Field of the Invention

The present invention relates to a camera which converts a picture of an object with photoelectric conversion to image signals for digital recording.

2. Description of Prior Art

This application is based on application No. 9-957/1997filed in Japan, the content of which is incorporated hereinto by reference.

A camera such as a video camera and a digital camera converts an optical picture of an object to image signals and records them in a recording medium. Some cameras have a liquid crystal display (LCD) monitor mounted to a camera main body, and a camera section is rotatable relative to the main body. A photographer can take a picture while observing himself or herself shown in the monitor.

In such a camera, the camera section is rotated around an axis in the lateral direction of the camera main body. Therefore, if the camera section is directed to the LCD monitor, when the image is displayed and recorded, the picture as shown in the LCD monitor is reversed in the vertical direction. By detecting an angle of the camera section relative to the main body, when an object in the side of the LCD monitor is photographed, the image data output in the LCD monitor is reversed upside down and recorded. Thus, the picture is displayed and recorded normally in such a case.

However, in general, a picture is taken by a video camera, a digital camera or the like on a natural object, and it needs a very large memory capacity to record the data of the picture. Therefore, in order to reverse the image data upside down and to record it at a fast speed, a very high speed central processing unit, an expensive signal processor, a memory of large capacity and the like are needed.

SUMMARY OF THE INVENTION

An object of the present invention is to provide a camera which can take a picture at a fast speed and display an inverted picture in the monitor without using an expensive and complicated circuit.

A digital camera of one aspect of the invention comprises a camera main body which processes and records picture signals, an image pickup device which takes a picture of an object and converts image signal of the object to picture signals with photoelectric conversion, and a display device which displays an optical image of the object taken by the image pickup device. A storage device stores the optical image of the object taken by the image pickup device. A detector detects whether a direction of optical axis of the image pickup device agrees with a direction of the picture in the display device. When the direction of optical axis of the image pickup device detected by the detector agrees with the direction of picture in the image pickup device, a controller controls the display device to display by reversing the signals taken by the image pickup device upside down, while it controls the storage device to store the optical image without reversing the signals. In this camera, a photographer himself or herself can be photographed by rotating the image pickup device to the side of the display device. When a picture is taken in this state, the picture shown in the display device can be reversed upside down, while it is recorded to the storage device without reversing the signals.

An advantage of the present invention is that when a photographer takes a picture while directing the image pickup device to an object in the side of the monitor, a picture can be taken at a fast speed without using an expensive and complicated circuit.

BRIEF DESCRIPTION OF THE DRAWINGS

These and other objects and features of the present invention will become clear from the following description taken in conjunction with the preferred embodiments thereof with reference to the accompanying drawings, and in which, and replace with the following:

FIG. 12 is a diagram of a table of the charge storage time SS and gain;

FIGS. 16A, 16B and 16C are diagrams of screens when a cursor is moved;

DETAILED DESCRIPTION OF THE PREFERRED EMBODIMENTS

Figure 1:
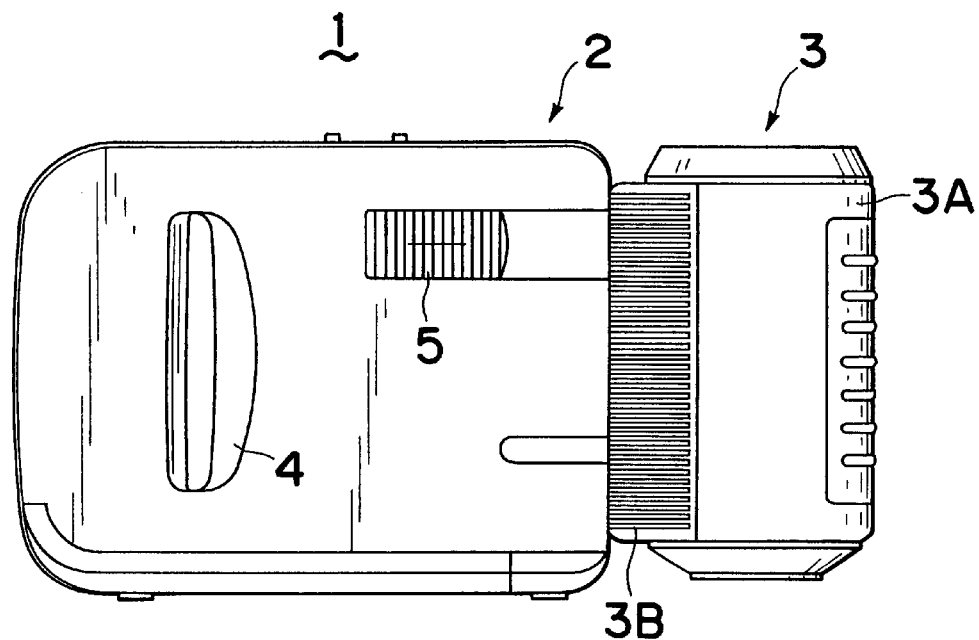
FIG. 1, is a front view of a digital camera of an embodiment of the invention.
Figure 2:
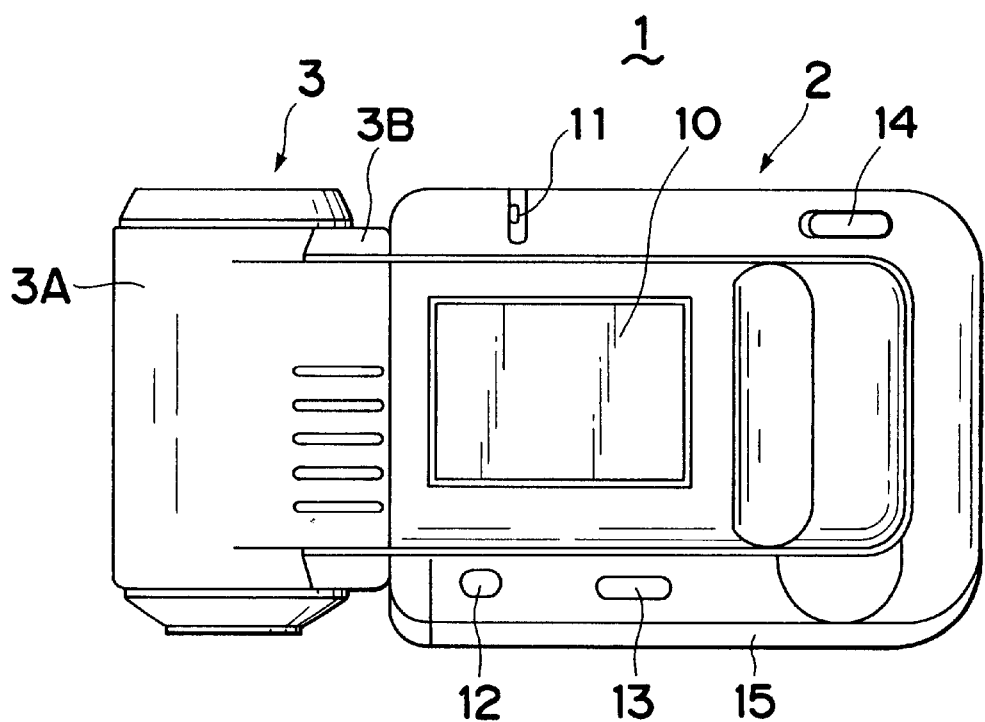
FIG. 2 is a back view of the digital camera shown in FIG. 1.
Figure 3:
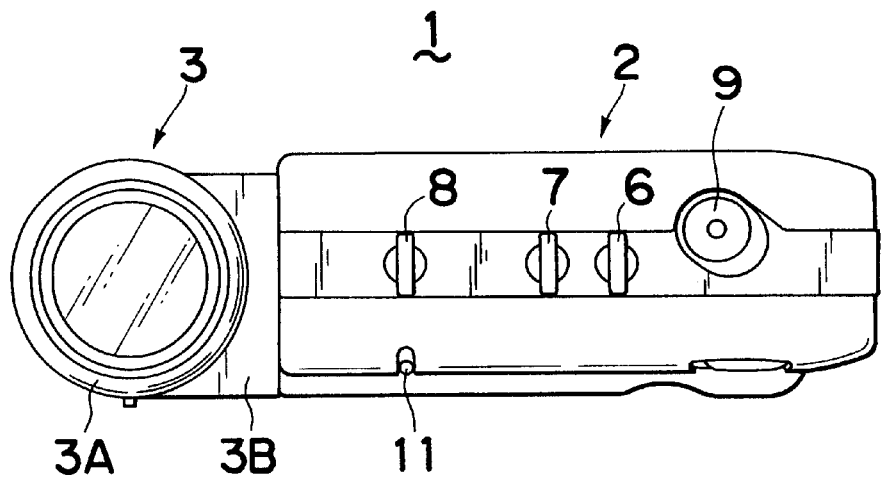
FIG. 3 is a top plan view of the digital camera shown in FIG. 1.
Figure 4:
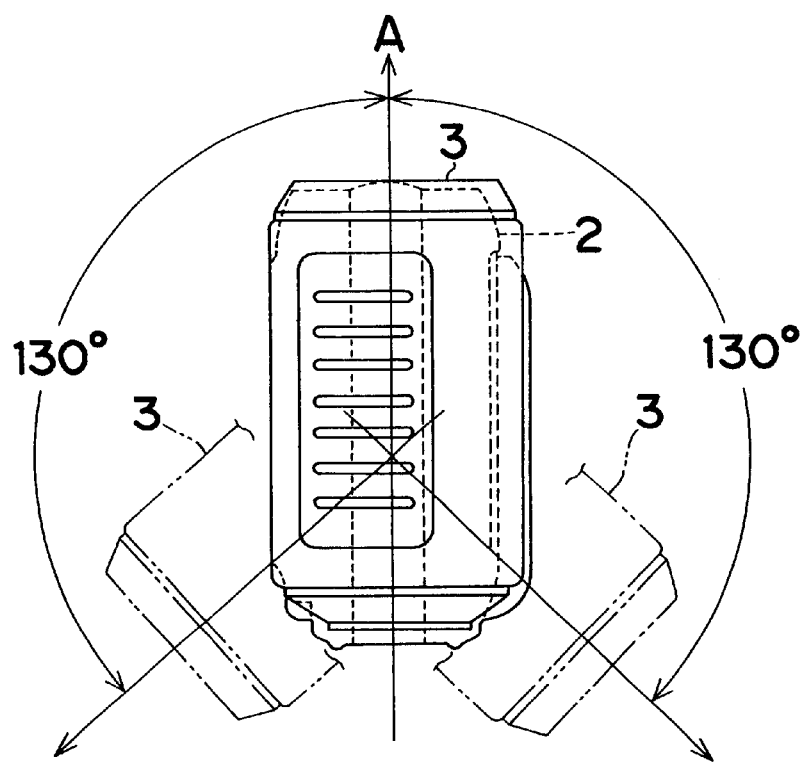
FIG. 4 is a side plan view of the digital camera shown in FIG. 1.

Referring now to the drawings, wherein like reference characters designate like or corresponding parts throughout the views, FIG. 1 shows a front view of a digital camera, FIG. 2 is a back view thereof, FIG. 3 is a top plan view thereof, and FIG. 4 is a side plan view thereof. As shown in FIG. 1, the digital camera 1 comprises a camera main body 2 of a box type, and an image pickup section 3 of a rectangular parallelepiped shape. The image pickup section 3 is detachable to the right side of the main body 2 when viewed from the front of the camera, and rotatable in a plane parallel to the right side. Further, as will be explained later, it can be connected to the main body 2 through an exclusive connection cable (refer to FIG. 5).

The image pickup section 3 has a front end having a lens window (that is, a top end plane in FIG. 1), in parallel to the top plane of the camera main body 2 in the camera shown in FIG. 1. The image pickup section 3 is rotated around an axis in the lateral direction of the camera main body 2. As shown as phantom lines in FIG. 4, the image pickup section 3 can be rotated within a range of 130° with reference to a standard position in the normal direction and in the reverse direction. The standard position represents a position where the front end of the image pickup section 3 is parallel to the top plane of the camera main body 2. In this position, a photographing direction agrees with the direction shown with "A".

The image pickup section 3 has a taking lens 301 (FIG. 5) and an image pickup device comprising a charge coupled device (CCD) 302 (FIG. 7) which converts an optical picture of an object to image data of electrical signals to be recorded. An output circuit 305 (FIG. 7) is provided inside the image pickup section 3 which outputs a signal for terminating flash emission, and a sensor 306 (FIG. 7)is provided at the front of the image pickup section 3 to receive a light reflected from the object due to flash light.

As shown in FIG. 2, the camera main body 2 includes at the rear side a display device 10 having a liquid crystal display (hereinafter referred to as LCD device), a connection portion to an IC card, and a connector 13 connected externally to a personal computer (hereinafter referred to as computer). The camera main body 2 processes the image signals received from the image pickup section 3 in a predetermined way, displays the processed signals in the LCD device 10, records them in an IC card, and transmits them to a personal computer.

The LCD device 10 is provided at the rear side of the camera main body 2 around the center at the left side for monitor display of a photograph picture (as a view finder) and for reproducing the recorded picture. A main switch 11 is provided at the top of the LCD device 10 for allowing/inhibiting the camera operation. At the lower side of the LCD device 10 are provided another switch 12 for setting a compression ratio of the picture data to be recorded in an IC card, and a connection terminal 13 for connecting externally to the computer. The main switch 11 and the compression ratio switch 12 are slide switches. The compression ratio of ⅛ or 1/20 can be selected. On the other hand, a connection detection switch (not shown) is provided inside the connector 13 for detecting connection of the cable the computer for data transmission.

Further, a mode switch 14 is at the top right of the LCD device 10 of the rear of the camera main body 2 for setting "photograph mode" or "reproduction mode". The photograph mode is a mode for taking a photograph, and the reproduction mode is a mode for reproducing a photograph picture recorded in an IC card in the display monitor 10. The mode switch 14 is also a slide switch.

As shown in FIG. 1, a built-in flashlight 5 and a grip 4 are provided at the front of the camera main body 2. The flashlight 5 is fixed to the camera main body 2. The optical axis of the taking lens agrees with that of the flashlight 5 when the image pickup section 3 is rotated by 90° from the standard position "A" toward the front side of the camera main body 2.

As shown in FIG. 2, a cover 15 of clam shell type for covering a space for loading an IC card is provided at the bottom of the camera main body 2, and an IC card is detachable by opening the cover 15.

As shown in FIG. 3, switches 6 and 7 are provided around the center of the top plane of the camera main body 2 for advancing a frame when recorded pictures are reproduced. The switch (UP switch) 6 and the switch (DOWN switch) 7 advance a frame in a direction increasing and decreasing the frame number of recorded pictures, respectively. A further switch 8 is provided at the left side of the DOWN switch 7 for index display which shows nine pictures at the same time in the display monitor 10 when recorded pictures are reproduced. A release button 9 is provided at the right side of the UP switch 6 for photographing and recording.

Figure 5:
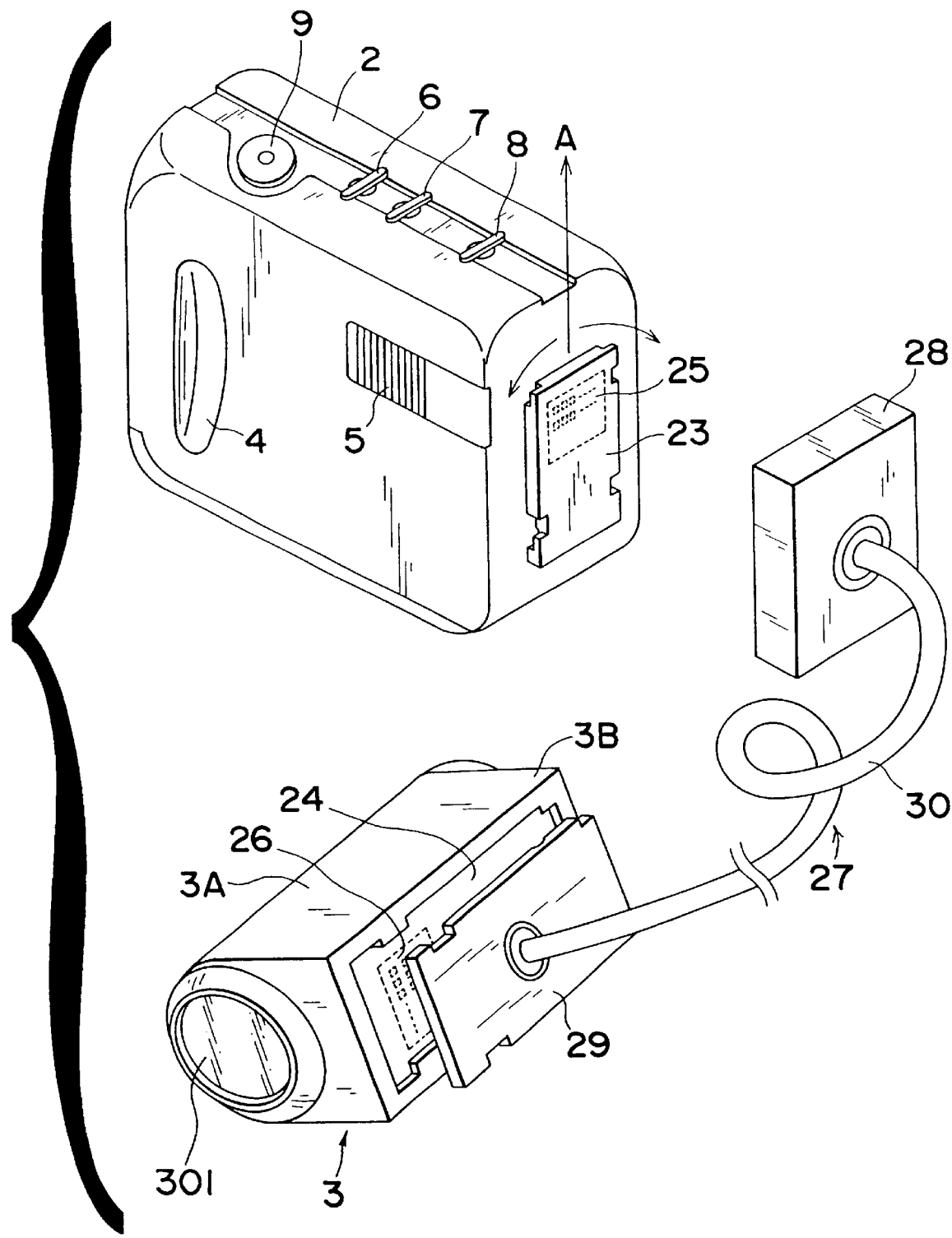
FIG. 5 is a perspective view for illustrating a connection mechanism of an image pickup section to a camera main body and a connection cable.

Next, a connection mechanism of the image pickup section 3 to the camera main body 2 and a connection cable 27 are explained with reference to FIG. 5. A connection plate 23 connecting the image pickup section 3 detachably is provided at the right side of the main body 2 when viewed from the front of the camera, and the connecting plate 23 can be rotated in a plane parallel to the right side. By rotating the connection plate 23, the image pickup section 3 mounted to the camera main body 2 is rotated within a range of 130° relative to the standard position "A".

A recess 24 is provided at a mount portion 3B of the image pickup section 3. The image pickup section 3 is mounted to the camera main body 2 by inserting the connection plate 23 to the recess 24 and sliding it. Lead pins 25 and 26 are provided for power supply and signal communication at the connection plate 23 of the camera main body 2 and at a recess 24 of the image pickup section 3 so as to oppose to each other when the image pickup section 3 is fixed to the connection plate 23.

The connection cable 27 has a cable 30 of one meter of length, a connection portion 29 having the same connection structure as the connection plate 23 at one end of the cable 30, and another connection portion 28 having the same connection structure as the mounting portion 3B at the other end of the cable 30. The image pickup section 3 is mounted directly or via the connection cable 27 to the camera main body 2.

Figure 6:
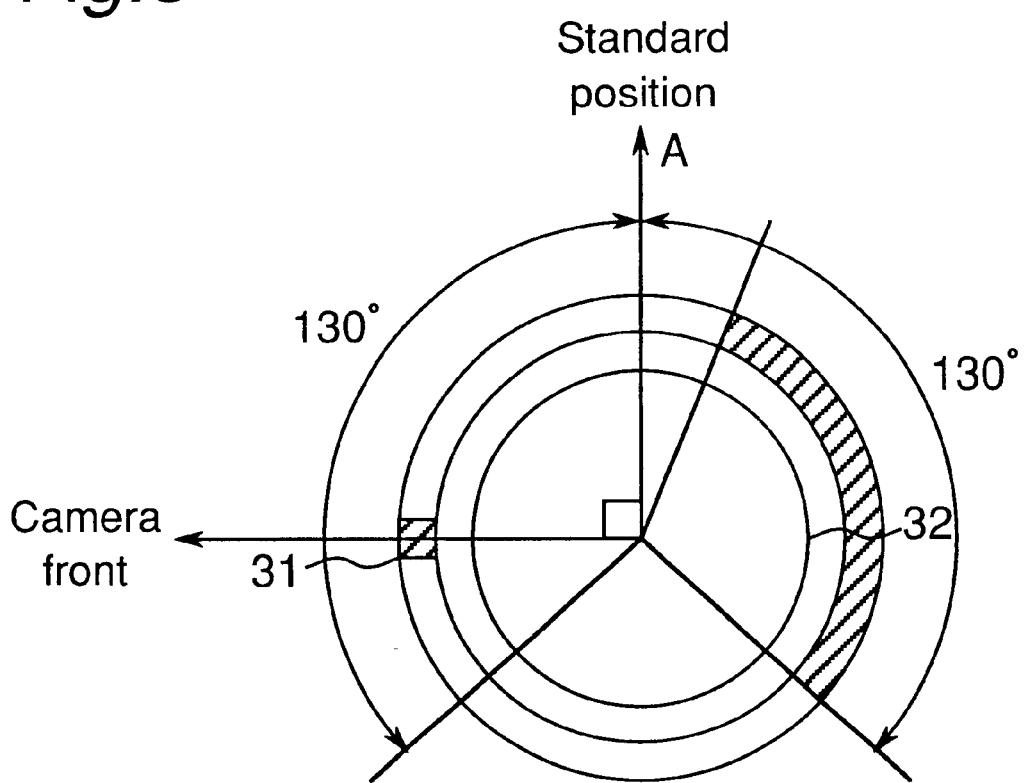
FIG. 6 is a diagram of electrically conducting patterns as a position detection switch of the image pickup section.

FIG. 6 shows electrically conducting patterns 31, 32 of a switch for detecting a position of the image pickup section 3 to the camera main body 2. At the connection plate 23 and at a mounting portion inside the camera main body 2, circuit boards are provided having an electrically conducting brush and the electrically conducting patterns shown in FIG. 6. The electrically conducting pattern 31 detects the optical axis of the taking lens which agrees with that of the flashlight. The switch is turned on when the image pickup section 3 is rotated by 90° from the standard position "A" toward the front. The other electrically conducting pattern 32 detects the image pickup section 3 rotated to the rear side of the camera main body 2. The switch is turned at a position rotated by 10° or more from the standard position "A" toward the rear side.

Figure 7:
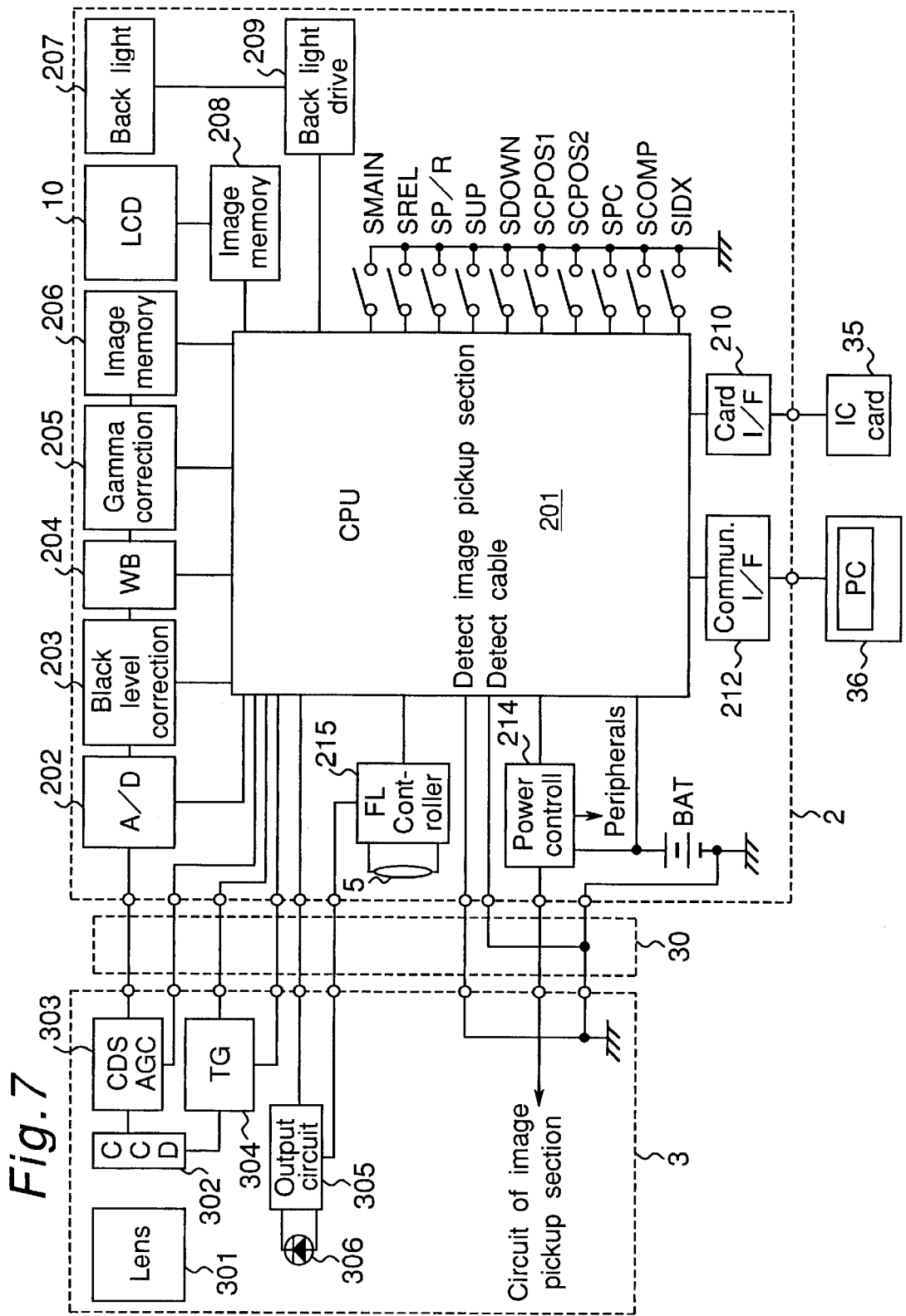
FIG. 7 is a block diagram of a control system of the digital camera.

FIG. 7 shows a block diagram of an electrical circuit of the digital camera 1 when the camera main body 2 is connected via the connection cable 27 to the image pickup section 3. The same reference characters as shown in FIGS. 1–6 designate like or corresponding parts.

The CCD area sensor 302 (hereinafter referred to as CCD) converts an optical picture of an object focused by the taking lens 301 to image signals of color components of red, green and blue. A timing generator 304 generates various timing pulses such as horizontal synchronization signal, vertical synchronization signal and transmission signal based on reference clocks received from the camera main body 2 for controlling the drive of the CCD 302. Exposure of the image pickup section 3 is controlled by controlling the charge accumulation time of the CCD 302 because the aperture stop diameter is fixed.

A signal processor 303 performs predetermined analog processing for the image signals received from the CCD 302. The signal processor 303 has a coherent double sampling circuit (CDS) and an auto gain control circuit (AGC). Noises of the image signals are reduced by the CDS circuit and the level thereof is adjusted by controlling the gain with the AGC circuit. The gain of the AGC circuit is set at two steps by a central processing unit (CPU) 201 in the camera main body 2.

The output circuit 305 is provided for controlling the amount of the built-in flashlight 5 on photographing with the flashlight. The reflection light from an object is received by the sensor 306, and when the amount of the reflection light detected by the sensor 306 increases to a predetermined value, a flash stop signal is sent from the output circuit 305 to a flash controller 215 in the main body 2. When the flash controller 215 receives a flash stop signal, it makes the flashlight 5 stop the emission thereof Thus, the amount of the exposure by the flashlight 5 for an object is controlled at the predetermined level.

In the camera main body 2, an analog-to-digital converter 202 converts the image signals from the image pickup section 3 to digital signals. A black level correction circuit 203 corrects the black level of the pixel signals (hereinafter referred to as pixel data) after A/D conversion to a standard black level. A white balance circuit 204 controls white balance of the pixel signals received from the black level correction circuit 203, and a gamma correction circuit 205 performs gamma correction of the pixel data received from the white balance circuit 204.

An image memory 206 is a memory for storing the image data received from the gamma correction circuit 205 The image memory 206 has a memory capacity of at least one frame. That is, it has a memory capacity equal to or larger than n times m times (pixel data bit number) when the CCD 302 has pixels of n lines and m columns.

An image memory 208 is a buffer memory for image data reproduced in the LCD device 10. The image memory 208 has a capacity of image data in correspondence to the pixel number of the LCD device 10, and the address of the image memory 208 has one-to-one correspondence relation to the display positions on the LCD device 10.

A back light 207 is provided to illuminate the display monitor 10 from the rear side, and a driver 209 drives the back light.

The above-mentioned processing from the output of the image signals from the CCD 302 to the storage of the pixel data in the image memory 20G are performed automatically according to the timing pulses generated by the timing generator 304. In the standby mode, image signals output from the image pickup section 3 every 1/30 second are stored in the image memory 206 after the signal processing by the above-mentioned components 202–205, and the image signals are displayed in the display monitor 10 after reading and thinning out of the image data by the CPU 201. Thus, the user can recognize the object image by observing a picture displayed in the display monitor 10. In the reproduction mode, a picture read from an IC card 35 is transferred to the image memory after signal processings such as expansion, and is reproduced in the display monitor 10.

A card interface 210 is an interface for write and read of image data to and from an IC card 35. A communication interface 212 is an interface for connecting to an external computer 36 for communication.

The flash controller 215 controls the light emission of the built-in flashlight 5. The flash controller 215 makes the flashlight 5 emit the flash according to a control signal from the CPU 201 and stop the emission according to a light stop signal from the output circuit 305.

A switch SMAIN is a power supply switch for the digital camera 1. When the switch is turned on, camera operation is allowed, while when it is turned off, camera operation is inhibited. A switch SREL is a switch for detecting a release operation of the release button 9. A switch SP/R corresponds to the switch 14 for changing between photograph mode and reproduction mode. Switches SUP and SDOWN correspond to the UP and DOWN switches 6 and 7. Switches SCPOS1 and SCPOS2 correspond to the electrically conducting brush and the electrically conducting pattern 31, 32 for detecting an angle of the image pickup section 3 relative to the main body 2. A switch SPC is a switch for detecting the PC cable, and it is turned on when the cable is connected to the main body 2 for communication with the computer 36. A switch SCOMP corresponds to the switch 12 for setting the compression ratio. A switch SIDX corresponds to the switch 8 for performing index display.

A power supply controller 214 controls power supply of a battery BAT loaded in the main body 2 to the peripherals and to the image pickup section 3.

Detection terminals for the image pickup section 3 and for the connection cable 27 detect mounting of the image pickup section 3 and of the connection cable 27 to the main body 2. When the image pickup section 3 and the connection cable 27 are not mounted to the main body 2, the terminals are pulled up to the high level. In the connection cable 27, a line opposing to the detection terminal for image pickup section is connected to the ground line, and in the image pickup section 3, a line opposing to the detection terminal and to the ground line of the connection cable 27 is grounded. The CPU 201 can detect the states of the terminals and detect the attachment/detachment of the connection cable 27 and the image pickup section 3.

The CPU 201 controls the above-mentioned blocks in the image pickup section 3 and the camera main body 2 for controlling the digital camera 1 integrally.

Figure 8:
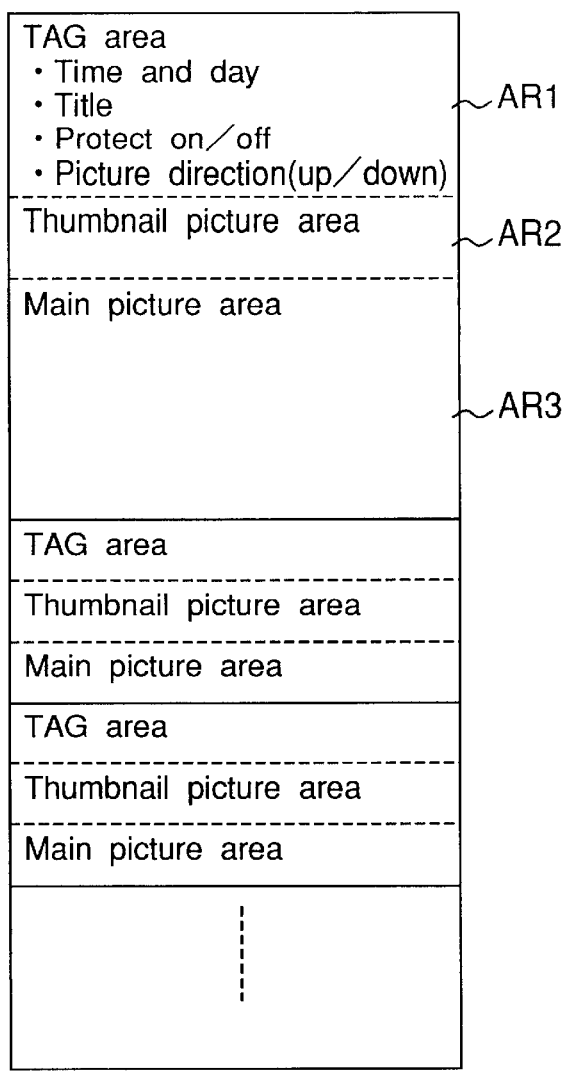
FIG. 8 is a diagram of a storage format of image data stored in an IC card.

FIG. 8 shows the image data stored in an IC card. Data of each picture has three areas of TAG area AR1, thumbnail picture area AR2 and main picture area AR3. The TAG area AR1 includes the data on the date of photographing, the title of picture, the set/reset of protection, the display direction (upward/downward). The thumbnail picture area AR2 stores a picture with a reduced number of pixels obtained by thinning out the data of the photograph picture. The main picture area AR3 stores image data compressed according to JPEG format.

Figure 9:
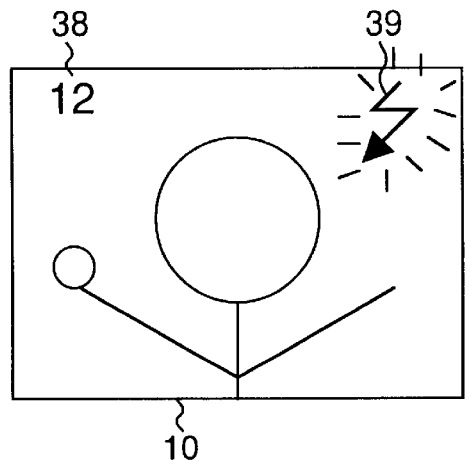
FIG. 9 is a diagram of an example of a picture shown in a liquid crystal display device.

FIG. 9 shows an example of a picture displayed in the display monitor 10 wherein a photographed picture is displayed. Further, a number 38 ("12" in this example) is displayed at the top left end of the display portion for representing the number of remaining frames wherein photo-graphing is possible. If necessary, a warning sign 39 for flashlight is displayed at the top right end of the display portion.

Figure 10:
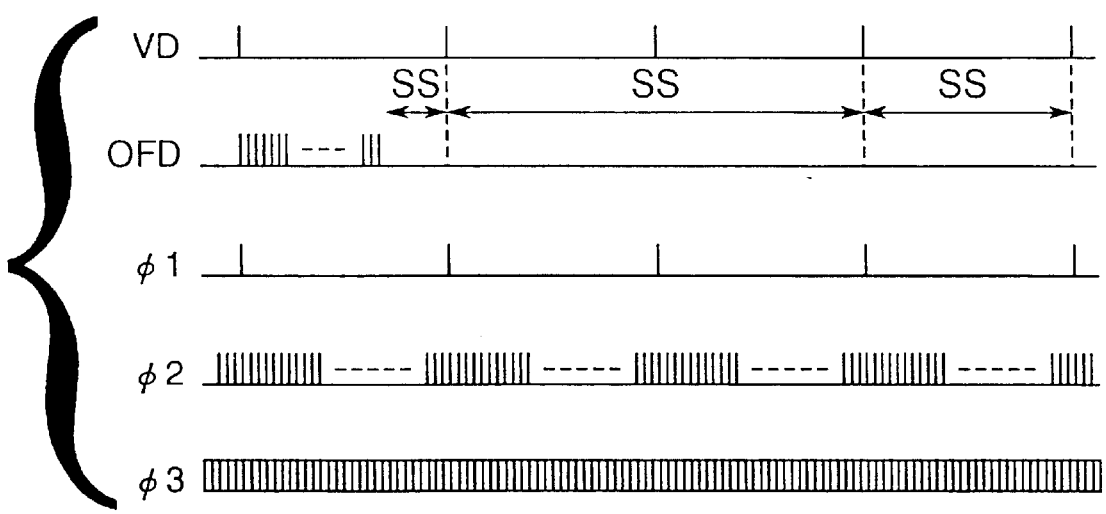
FIG. 10 is a time chart for driving a CCD area sensor

FIG. 10 is a time chart for driving the CCD 302, wherein VD denotes vertical synchronization pulse, OFD denotes overflow drain control signal, φ1 represents shift pulse for shifting the accumulated charges to a vertical transfer section, φ2 represents horizontal synchronization pulse, and φ3 represents read pulse for transferring the charges in a horizontal transfer section and for reading the data. The vertical synchronization pulse VD is output every $1/30$ second. The overflow drain control signal OFD and the shift pulse φ1 are controlled according to the charge accumulation time SS which has been set. If the charge accumulation time SS is shorter than $1/30$ second, an overflow drain control signal OFD is output for draining the unnecessary charges after a vertical synchronization pulse VD for a period of $1/30$ second subtracted by the charge accumulation time SS. Then, charge accumulation is started. If the charge accumulation time SS is longer than $1/30$ second, the shift pulse φ1 is inhibited in a period in correspondence to the charge accumulation time SS to realize a charge accumulation time longer than $1/30$ second.

Figure 11A:
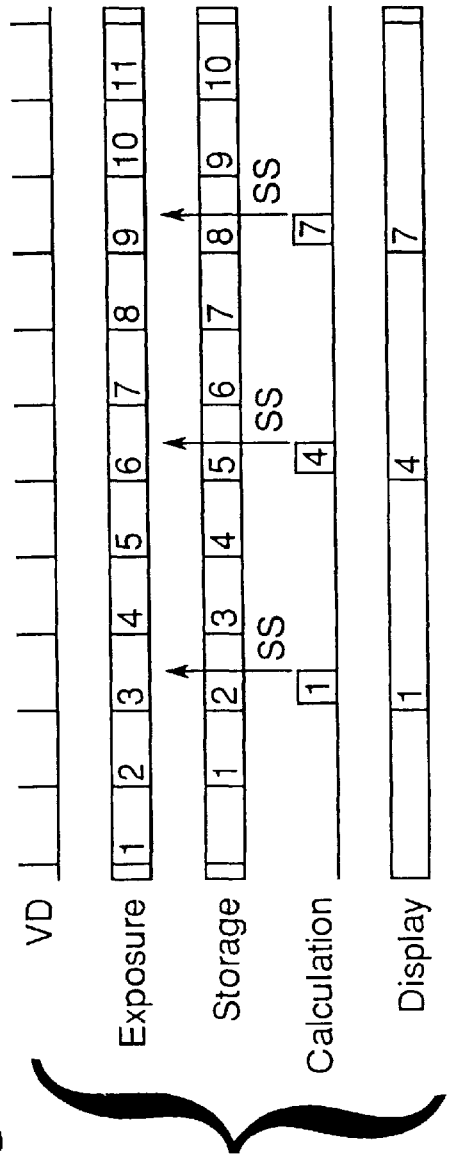
FIGS. 11A and 11B are time charts of photographing, data storage and display when charge storage time SS is equal to or shorter than $\frac{1}{30}$ second and when it is longer than $\frac{1}{30}$ second, say $\frac{1}{15}$ second.
Figure 11B:
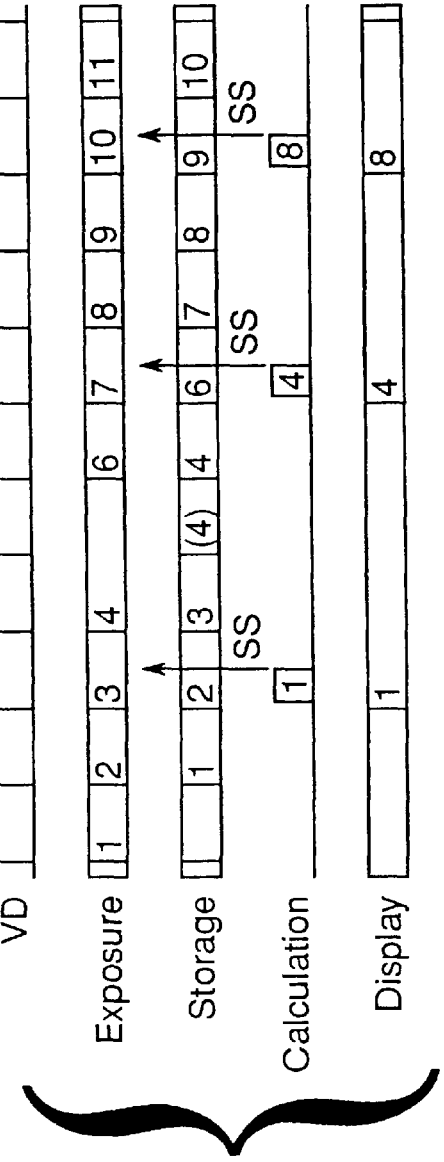

FIGS. 11A and 11B are time charts of photographing, data storage and display. FIG. 11A shows the time chart when the charge storage time SS is equal to or shorter than $1/30$ second. The exposure at the VD pulse designated with "4" is controlled based on the charge accumulation time SS which is set during the exposure period designated with "3". In synchronization to a VD pulse just after the charge accumulation, the pixel data obtained by photographing in the charge accumulation time SS is shifted and read to be stored in the image memory 206 (the storage period designated with "4"), and in synchronization to a next VD pulse, the pixel data are displayed in the LCD device 10 (the display period designated with "4") and exposure calculation (exposure calculation designated with "4") is performed to send the data of the charge accumulation time SS to the timing generator 304. The transmitted charge accumulation time data is reflected at a next charge accumulation time SS (the exposure period designated with "7"). By repeating the above-mentioned sequence, the charge accumulation time SS is set and the display is updated every three frames of photograph pictures or $1/10$ second.

FIG. 11B shows the time chart when the exposure time SS is longer than $1/30$ second, say $1/15$ second. The exposure at the exposure period designated with "4" is controlled based on the charge accumulation time SS which is set during the exposure period designated with "3". If the charge accumulation period SS is $1/15$ second longer than $1/30$ second, the first shift pulse just after the charge accumulation is inhibited. Therefore, the accumulated image data are not stored in the image memory 206 or black data are stored (in the period designated with "(4)"). Then, the image data for the exposure period designated with "4" are stored in the image memory 206 in synchronization to a next VD pulse (in the storage period designated with "4 '"). Therefore, by delaying the timings for update of display and exposure calculation by one VD pulse, the photograph data in the charge accumulation time SS is displayed (in the display period designated with "4") and subjected to exposure calculation (in the calculation period designated with "4"). As mentioned above, when a charge accumulation time SS is longer that $1/30$ second, the charge accumulation time SS is set and the display is updated every $1/7.5$ second.

FIG. 12 shows a table (SS table) of the charge accumulation time SS. When photographing is started, the charge accumulation time SS is set to $1/128$ second initially. Exposure operation is performed on image data obtained by using the charge accumulation time. If it is decided that the exposure is over, the charge accumulation time SS is shifted by one step to the high speed side in the table. On the other hand, if it is decided that the exposure is under, the charge accumulation time SS is shifted by one step to the low speed side in the table. The gain of the auto gain controller 303 is set at a low value in a range between $1/1024$ and $1/32$ second. Low and high gain values are provided in a range between $1/30$ and $1/10$ second. Therefore, a low noise picture can be obtained in a sufficiently bright scene, while an image with blur as small as possible is obtained for a dark scene.

Figure 13:
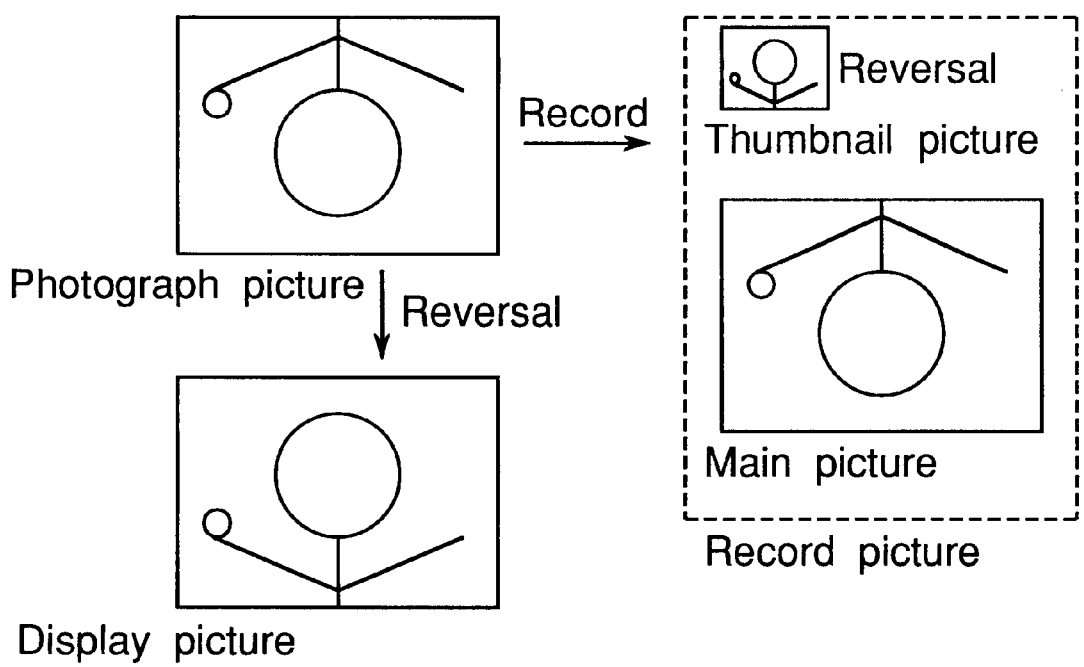
FIG. 13 is a diagram for illustrating a relation between a photographed picture and a recorded picture along a vertical direction when the image pickup section has a position at the side of the LCD device.

FIG. 13 illustrates a relation between a photographed picture and a recorded picture in the vertical direction when the image pickup section 3 is directed to the side of the display monitor 10. In the camera of this embodiment, when the image pickup section 3 is directed to the side of the LCD device 10, a picture of a photographer can be taken easily by reversing the direction of the picture. When the release button 9 is pressed to record the picture in an IC card, only the thumbnail picture is reversed in the vertical direction, while the main picture is recorded normally. In the TAG area, a data which indicates the reversal of the direction of picture in the vertical direction is recorded. Then, when the picture is reproduced, the main picture is reversed based on the data in the TAG area, so that a picture can be reproduced in the normal direction.

Figures 14A, 14B:
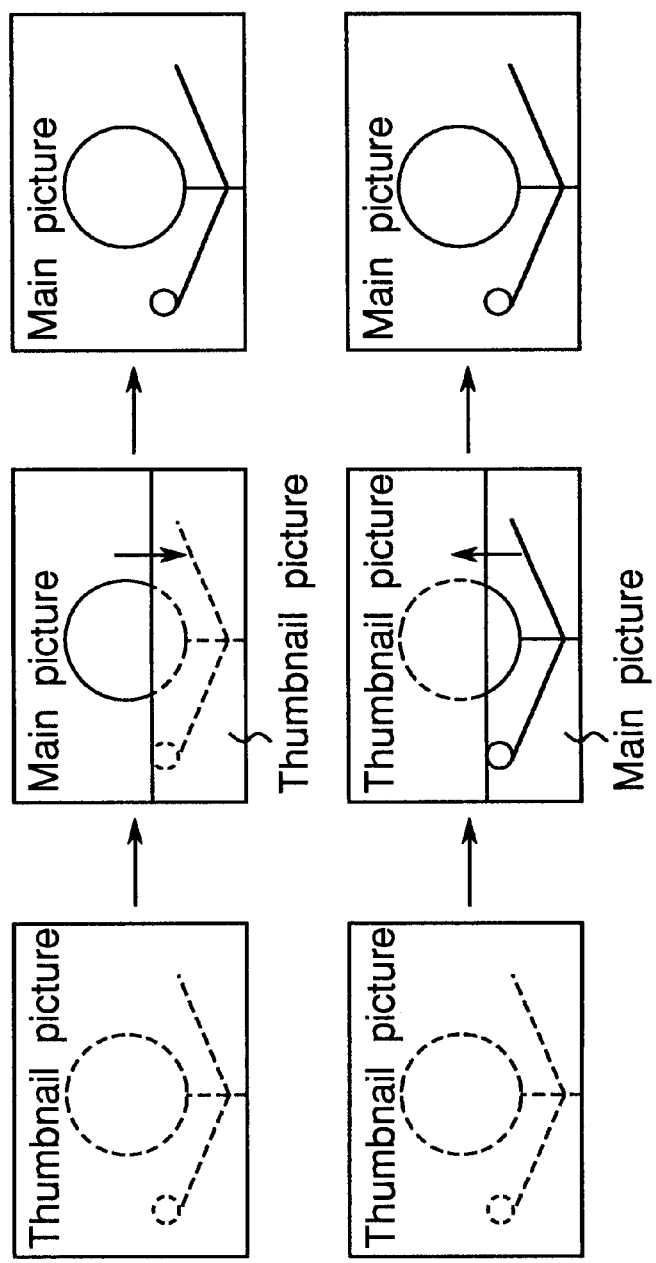
FIGS. 14A and 14B are diagrams of reproduction and display of recorded images for a normal picture and for a reversed picture.

Because the thumbnail picture is recorded as a reversed picture upside down in the vertical direction as mentioned above, it can be displayed at a fast speed when it is reproduced. A time needed to the reversal of the thumbnail picture on recording is in a negligible range if compared with the recording time of the thumbnail picture and the entire main picture. Therefore, recording by reversing the thumbnail picture is not a problem. As to the main picture, a time needed for reversing the picture is relatively long, and it affects the recording time. Then, the main picture is compressed and recorded without reversal in the vertical direction. By adopting the above-mentioned recording procedure, a picture can be recorded in a short time FIGS. 14A and 14B show examples of reproduction and display of recorded images. FIG. 14A shows an example for a normal picture. First, the thumbnail picture is displayed at a fast speed. Then, the main picture is expanded while replacing the thumbnail picture from the top of the picture. FIG. 14B shows an example for a reversed picture. As in the example shown in FIG. 14A, the thumbnail picture is displayed first at a fast speed. Then, the main picture is expanded while replacing the thumbnail picture. In the expansion, the expanded data is transmitted to the image memory 208 so that the main picture itself is not reversed, but the reversed main picture replaces the thumbnail picture from the bottom thereof. Thus, the display is performed in the same time as the normal reproduction.

Figure 15:
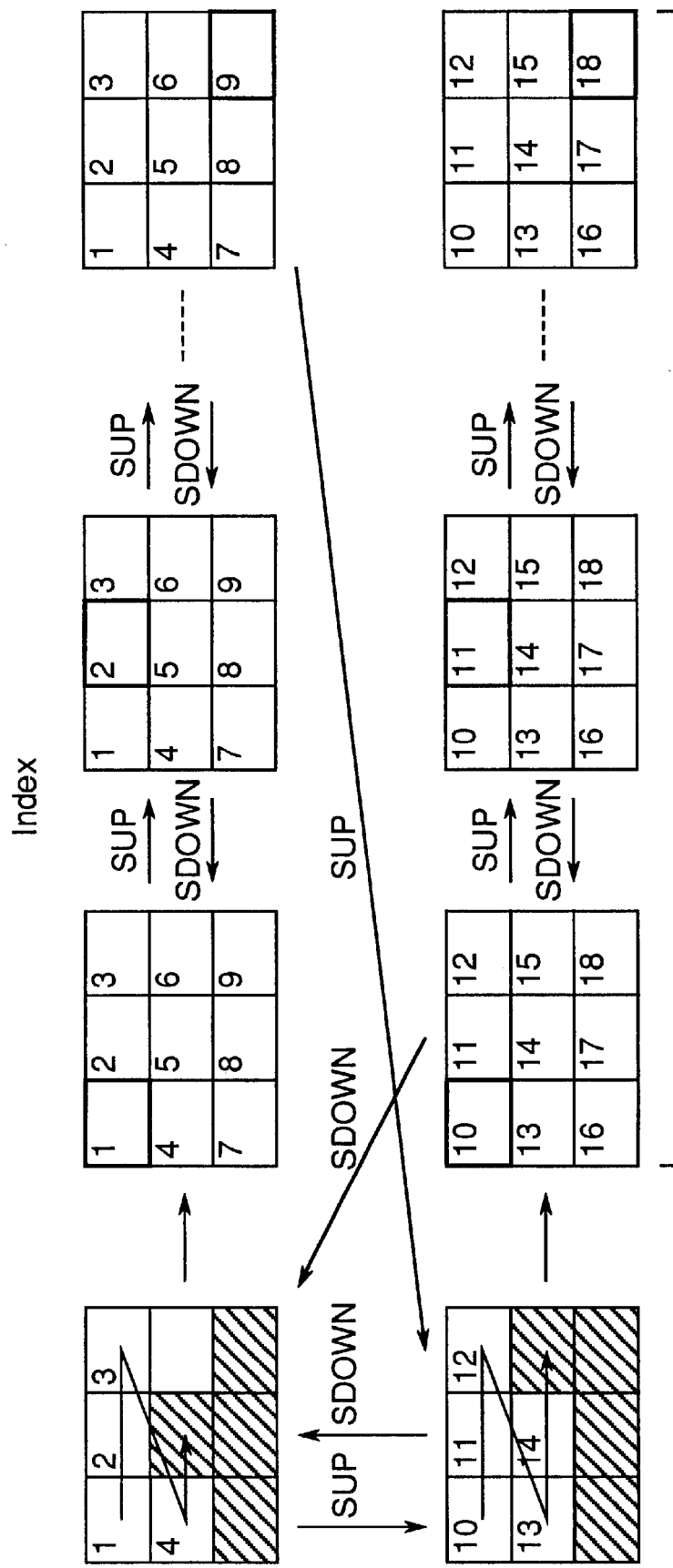
FIG. 15 is a diagram on a relation of index display to operation of switches.

FIG. 15 shows a relation of index display to switching. In the index display mode, an image of a size of $1/9$ of a normal image is displayed successively from the first frame at the top left end in the screen. If the UP switch is turned on before all the frames (nine frames) are displayed, the screen is changed to a next page to start a new index display from the tenth frame, as shown at the lower side in FIG. 15. On the other hand, if the DOWN switch is turned on before all the frames (nine frames) are displayed, the screen is changed to a previous page to start a new index display.

When the index display of all nine frames is completed, a picture of the smallest frame number is encircled with a cursor (thick framework). If the UP switch is turned on in this state, the cursor is moved to a frame having a frame number larger by one in the same screen. On the other hand, if the DOWN switch is turned on, the cursor is moved to a frame having a frame number smaller by one in the same screen.

If the UP switch is turned on in a state where the cursor is moved to a frame having the largest frame number in the page, the screen is changed to a next page to start a new index display of the next page. If the DOWN switch is turned on in a state where the cursor is moved to a frame having the smallest frame number in the page, the screen is changed to a previous page to start a new index display of the previous page. Therefore, the movement of the cursor and the change of page are performed only by using the two operation switches, or the number of the operation members can be decreased.

Figures 16A, 16B, 16C:
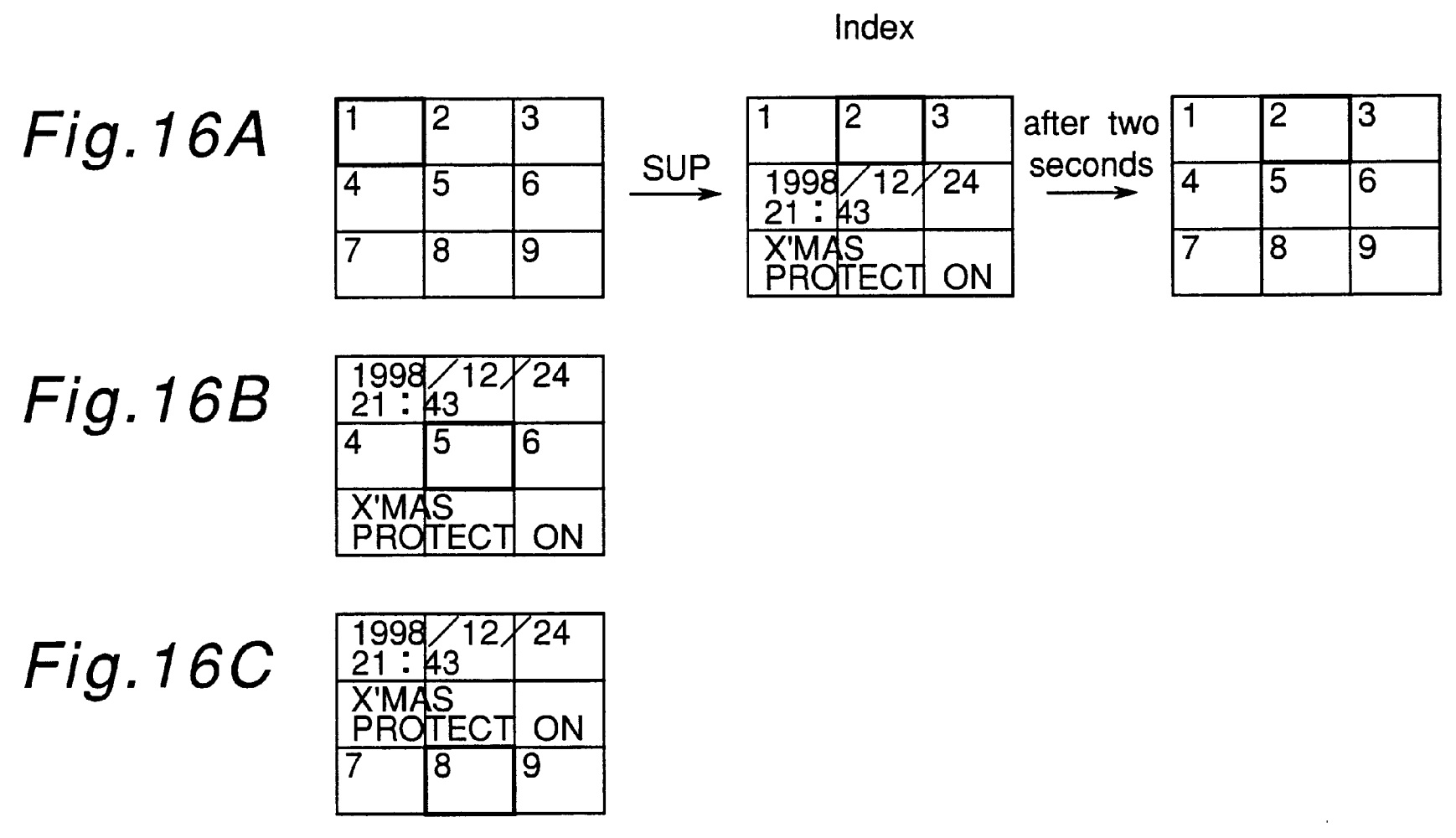

FIGS. 16A, 16B and 16C show examples of a screen when the cursor is moved. When the cursor is moved in the index display play from the frame number "1" to the frame number "2", information on the picture with the frame is shown for two seconds in a portion not overlapped with the selected picture with the frame. The area in which the information is displayed depends on the position of the selected picture. As shown in FIG. 16A, if the selected picture has a frame number of one of "1" to "3", the information is shown in the pictures of frame numbers of "4" to "9". As shown in FIG. 16B, if the selected picture has a frame number of one of "4" to "6", the information is shown in the pictures having frame numbers of "1" to "3" and "7" to "9". As shown in FIG. 16C, if the selected picture has a frame number of one of "7" to "9", the information is shown in the pictures of frame numbers of "1" to "6". As the information on the selected picture is shown not inside the picture, but outside the picture, the information can be recognized surely.

Figure 17:
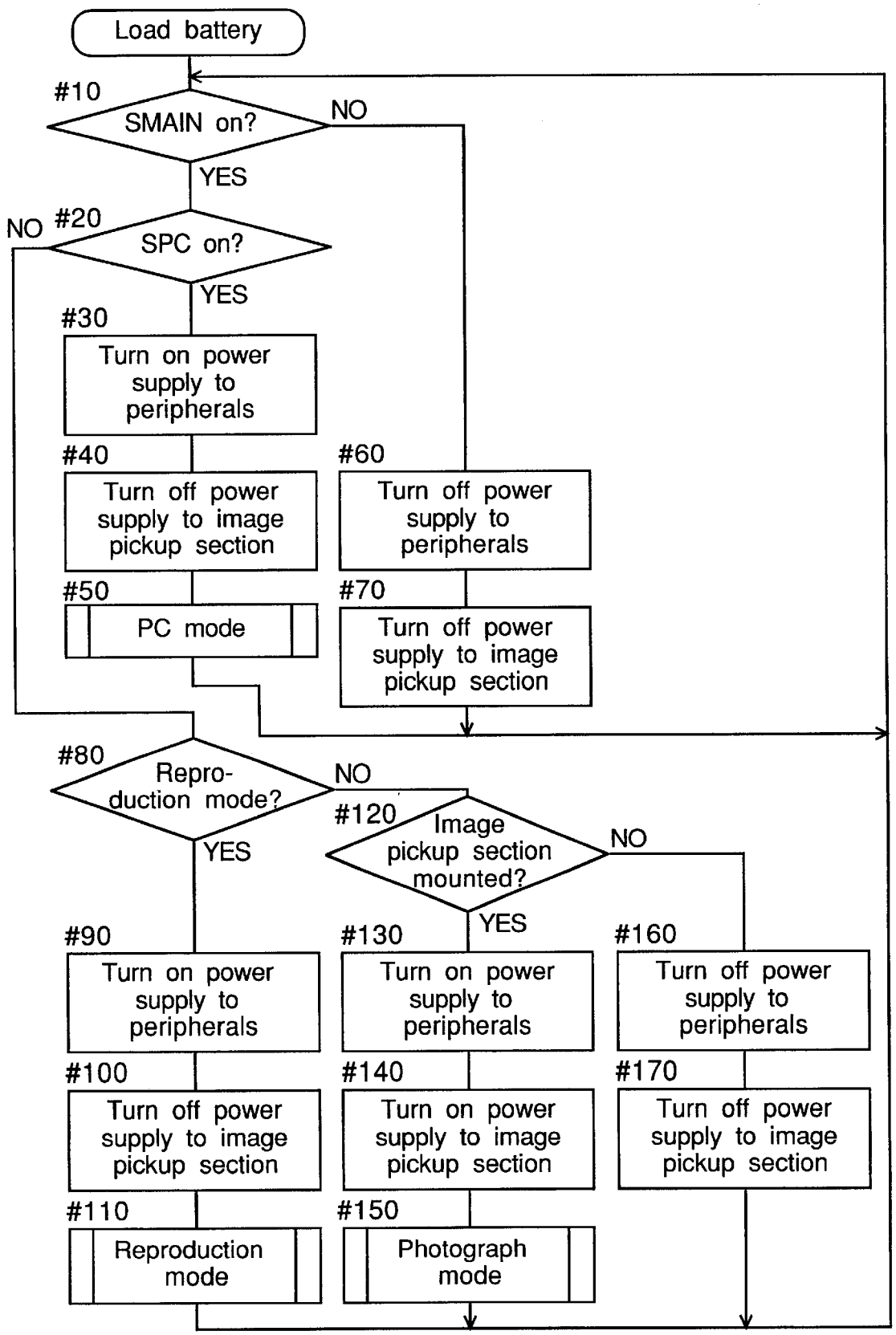
FIG 17 is a flowchart when a battery is loaded.
Figure 18A:
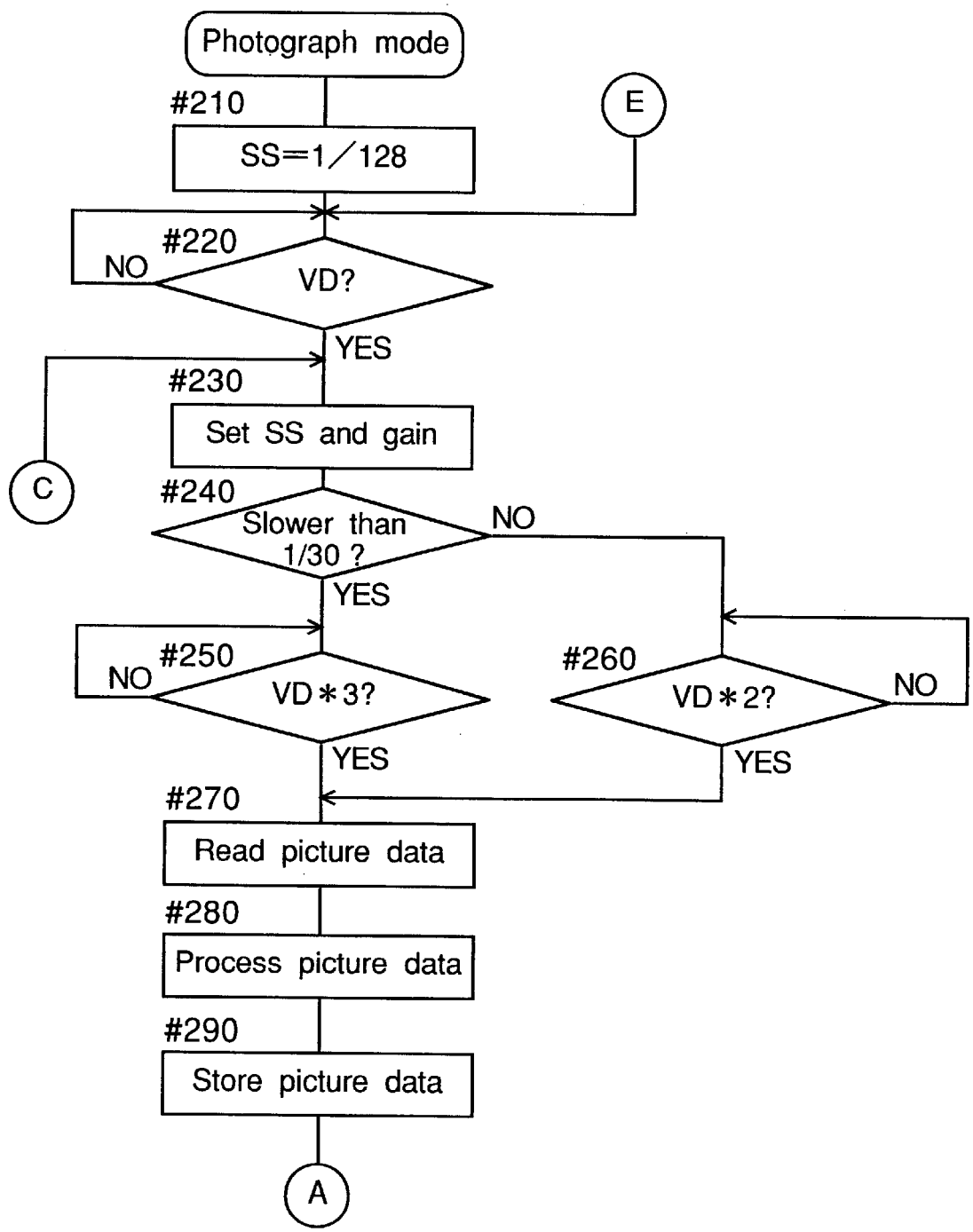
FIGS. 18A, 18B, 18C and 18D are flowcharts of photograph mode.
Figure 18B:
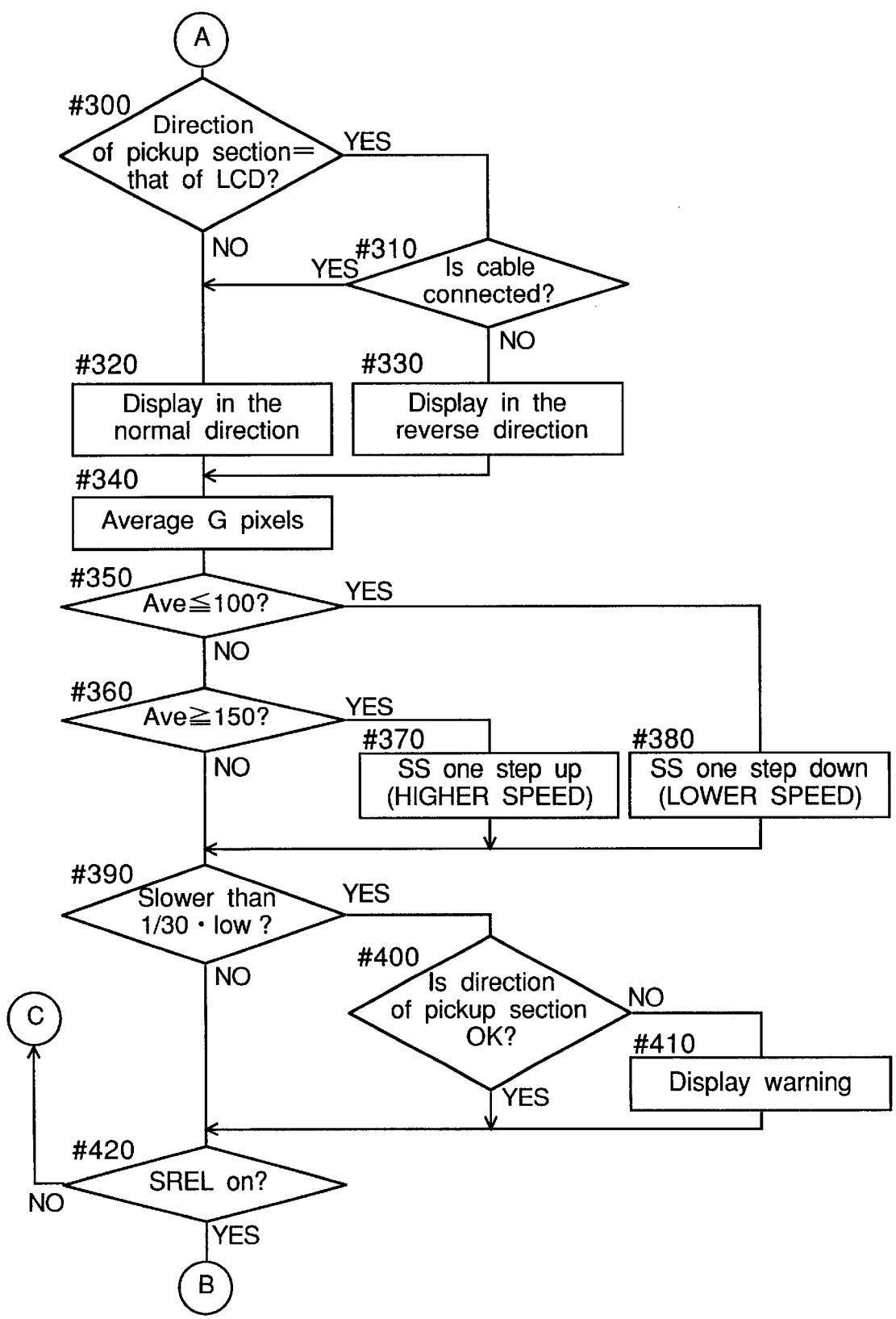
Figure 18C:
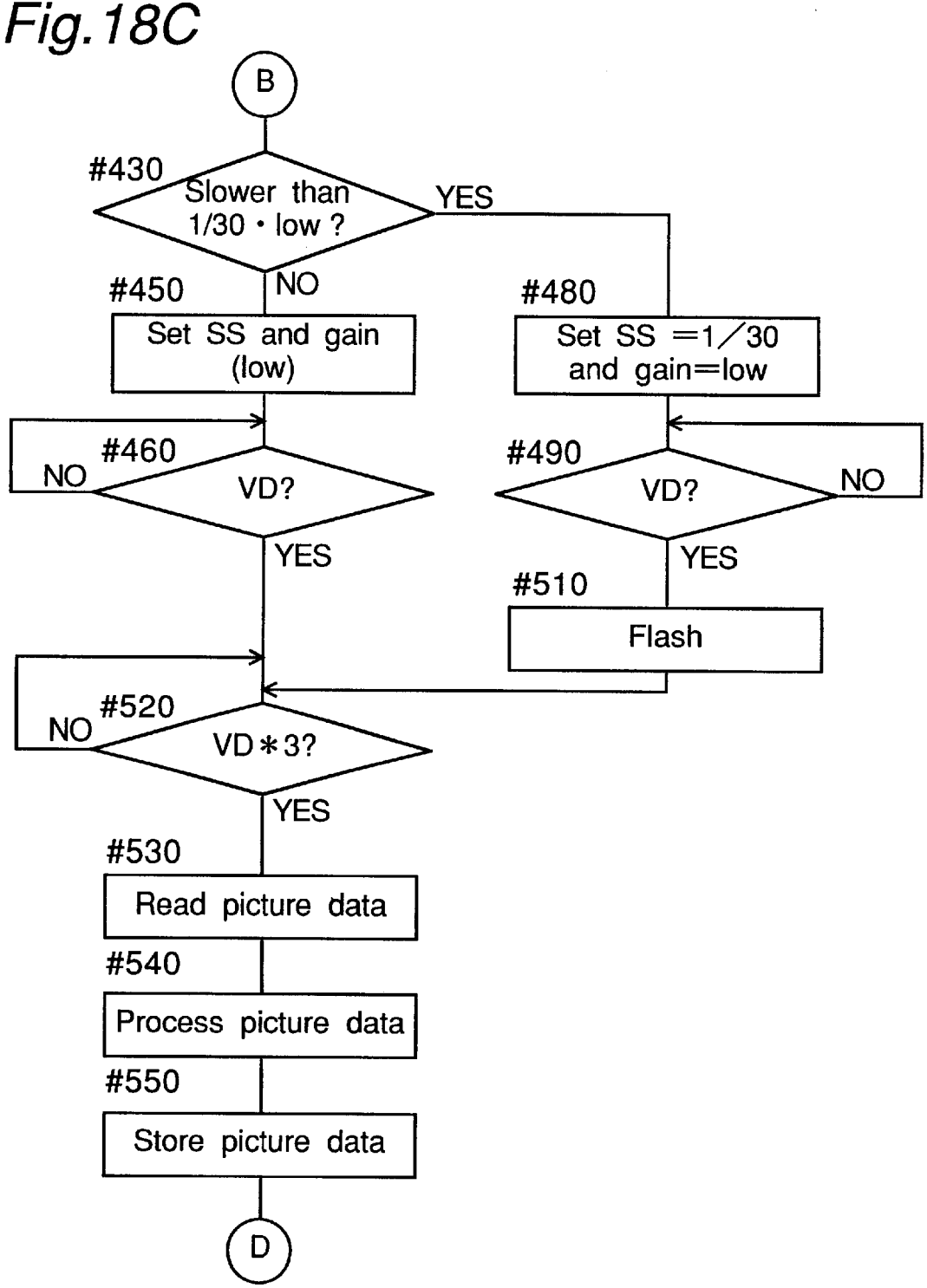
Figure 18D:
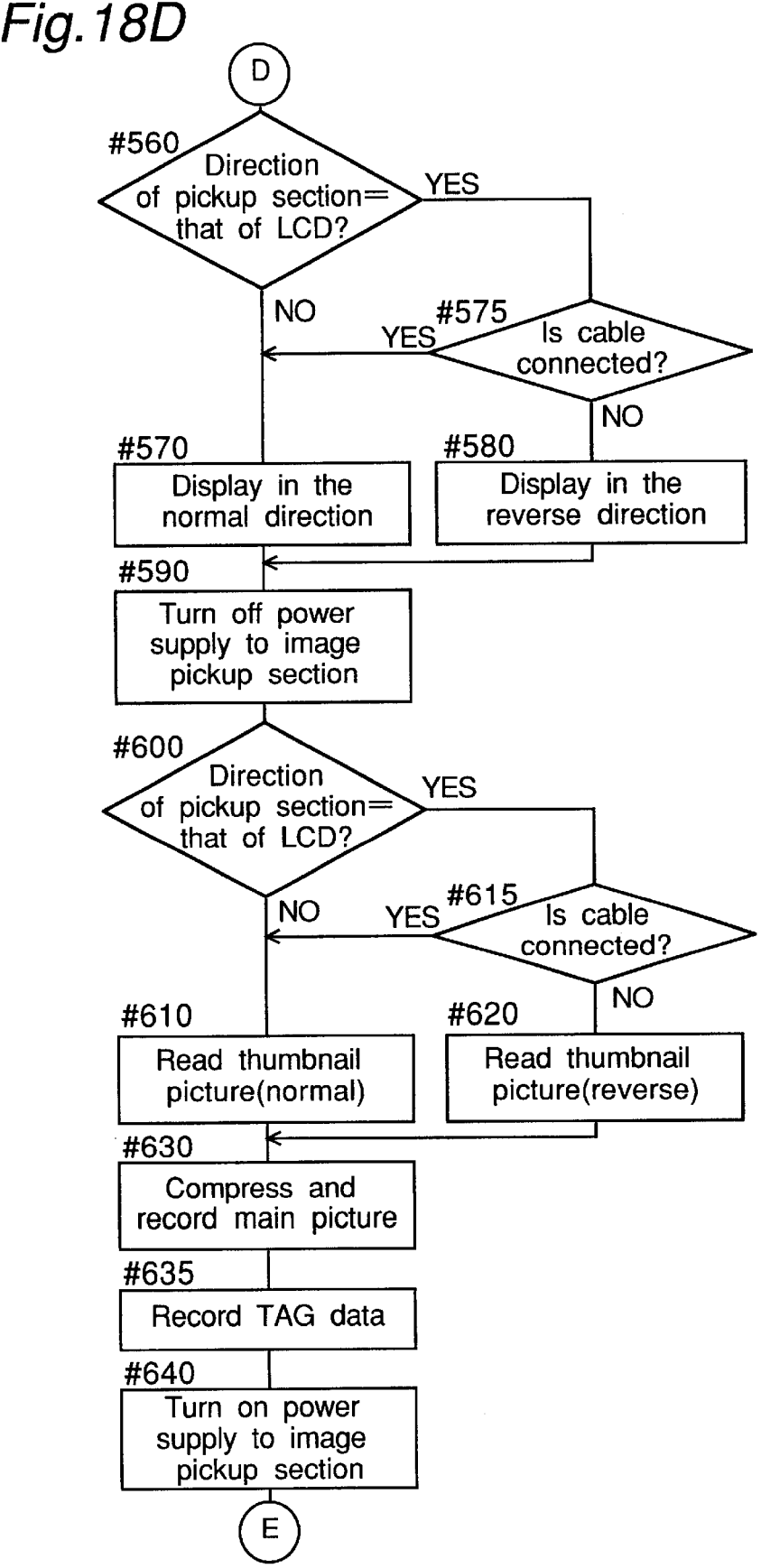

The operation of the digital camera of this embodiment is explained below with reference to FIGS. 17 to 23. FIG. 17 is a flowchart when a battery is loaded. First, it is decided whether the main switch SMAIN is turned on or not (step #10). If the main switch SMAIN is decided not to be turned on, power supply to the peripherals and the image pickup section 3 is stopped (steps #160 and #170).

If the main switch SMAIN is decided to be turned on, it is decided next whether the switch SPC is turned on or not (step #20). If the switch SPC is decided to be turned on, the computer 36 is connected. Then, power supply to the peripherals provided in the camera main body 2 is turned on (step #30), and power supply to the image pickup section 3 is stopped (step #40). Then, the processing of the PC mode is performed which will be explained later (step #50). Then, the flow returns to step #10.

If the switch SPC is decided not to be turned on (NO at step #20), it is decided next whether the reproduction mode is decided to be set or not by checking the switch SP/R (step #80). If the reproduction mode is decided to be set, power supply to the peripherals is turned on (step #90), and power supply to the image pickup section 3 is stopped (step #100). Then, the processing of the reproduction mode to be explained later is performed (step #110). Then, the flow returns to step #10.

If the reproduction mode is decided not to be set, or if the photograph mode is set, it is decided next whether the image pickup section 3 is connected or not (step #120). If the image pickup section 3 is decided to be connected, power supply to the peripherals is turned on (step #130), and power supply to the image pickup section 3 is also turned on (step #140). Then, the processing of the photograph mode which will be explained later is performed (step #150). Then, the flow returns to step #10.

If the image pickup section 3 is decided not to be connected (NO at step #120), power supply to the peripherals is turned off (step #160), and power supply to the image pickup section 3 is also turned off (step #170). Then, the flow returns to step #10. Thus, when the image pickup section 3 is not connected, no electric power is supplied to the image pickup section 3 and no electric power is used wastefully. Further, because the photograph mode is not set, the transmission to the image pickup section 3 such as the supply of the clock pulses by the timing generator 304 is all inhibited and consumption of power supply can be reduced.

In this embodiment, the switches SMAIN and SP/R are connected to interrupt terminals of the CPU 201. If the switches are changed, the operation is started from step #10 of this flowchart. It is to be noted in the following flowcharts explained below, the interrupt of the switches is inhibited during the operations of photographing, recording and display.

FIGS. 18A, 18B, 18C and 18D show a flowchart of the photograph mode. First, the charge storage time SS is set to $\frac{1}{128}$ second (step #210), and it is waited until a vertical synchronization pulse VD is generated (YES at step #220).

In correspondence to the generation of the vertical synchronization pulse, the charge storage time SS, the gain and the like determined above are set (step #230). Then, if the charge storage time SS is slow (longer) than $\frac{1}{30}$ second (YES at step #240), it is waited that three vertical synchronization pulses VD are generated (YES at step #250). On the other hand, if the charge storage time SS is not slower (longer) than $\frac{1}{30}$ second (NO at step #240), it is waited that two vertical synchronization pulses VD are generated (YES at step #260).

After the vertical synchronization pulses VD of the above-mentioned number in correspondence to the two cases are generated, image data are read (step #270), image processing on the image data is performed (step #280), and the processed image data are stored (step #290). (These processings are performed every $\frac{1}{30}$ second actually.)

Then, the direction of the image pickup section is detected. If it is decided that the direction of the image pickup section 3 agrees with that of the liquid crystal display monitor 10 (at the rear side) (YES at step #300), and if the connection cable 27 is decided not to be connected (NO at step #310), the vertical direction of the picture is reversed upside down by setting the image data in the image memory so as to reverse the picture upside down (step #330). Otherwise the as received image data are set in the image memory or the picture in the normal direction is displayed (step #320). The picture is not reversed when the connection cable 27 is connected because the direction of the image pickup section is not certain in this case so that the reverse display of the picture has no sense.

Next, for exposure control, 8-bit data of green pixels among the pixel data are averaged (step #340). If the average is equal to or smaller than 100 (YES at step #350), the charge storage time and the gain are changed to values by one step to the low speed side in the SS table (step #380). If the average is equal to or larger than 150 (YES at step #360), the charge storage time and the gain are changed to values by one step to the high speed side in the SS table (step #370).

Next, it is decided whether the charge storage time SS is at the low speed side (longer) than $\frac{1}{30}$ second for the low gain (step #390). If the charge storage time SS is decided to be at the low speed side, the direction of the image pickup section 3 is detected. If the direction of the image pickup section is detected not to be in parallel to the optical axis of the built-in flashlight 5 (NO at step #400), a warning is displayed in the display monitor 10. That is, the warning is displayed only when the flashlight 5 may be operated, and an unnecessary warning is prevented when the flashlight 5 is not used. It is desirable that the necessity of the flashlight 5 is decided by considering further the brightness of the object for the digital camera which can force or inhibit the flashlight 5 to emit.

Next, it is decided whether the switch SREL is turned on or not (step #420). If the switch SREL is decided not to be turned on, the flow returns to step #230, otherwise the flow moves to step #430.

The flow after step #430 relates to exposure control for recording to the IC card. First, it is decided whether the charge storage time SS is at the lower speed side than 1/30 second for the low gain (step #430). If the charge storage time is decided not to be at the lower speed side (NO step #430), the charge storage time and the gain obtained at steps #340–#380 are set, and it is waited two times that a vertical synchronization pulse VD is generated (YES at step #460 and YES at step #520). On the other hand, if the charge storage time SS is at the lower speed side (YES at step #430), the charge storage time SS is set to 1/30 second, and the gain is set to the low value (step #480). Then, after it is waited that a vertical synchronization pulse VD is generated (YES at step #490), the flashlight 5 is emitted (step #510). Then, after it is waited that another vertical synchronization pulse VD is generated (YES at step #520), image data are read (step #530), image processing on the image data is performed (step #540), and the processed image data are stored (step #550). (These processings are performed every 1/30 second actually.)

In this embodiment, the flashlight is operated only when the charge storage time is 1/30 second. However, if the flashlight is operated even when the charge storage time is faster (shorter) than 1/30 second due to backlight automatic flashing, forced flashing or the like, the flashlight may be emitted after one vertical synchronization pulse is generated and after draining of unnecessary charges is completed. Emission may also be started before a predetermined time before the end of the exposure.

Then, similarly to steps #300–#330, the direction of the image pickup section and the cable connection are detected, and the photograph picture is displayed. First, if it is decided that the direction of the image pickup section 3 agrees with that of the display monitor 10 (the rear side) (YES at step #560), and if the connection cable 27 is decided not to be connected (NO at step #570), the vertical direction of the picture is reversed upside down by setting the image data in the image memory so as to reverse the picture upside down (step #580). Otherwise the as received image data are set in the image memory or the picture in the normal direction is displayed (step #570).

Next, the power supply to the image pickup section is stopped once (step #590). If it is decided that the direction of the image pickup section 3 agrees with that of the display monitor 10 (YES at step #600), and if the connection cable 27 is decided not to be connected (NO at step #615), the thumbnail picture is recorded in the reverse direction (step #620). Otherwise the thumbnail picture is recorded in the normal direction (step #630). Then, the main picture is compressed and recorded (step #610), and various information (photograph date, title, the direction of picture in the vertical direction and the like) are recorded in the TAG area (step #635). After the above recording is completed, the power supply to the image pickup section 3 is permitted (step #640), and the flow returns to step #220. By stopping power supply to the image pickup section 3 when data are recorded in the IC card, the state of the power supply is stabilized, and the reliability of recording to the IC card is improved.

Figure 19:
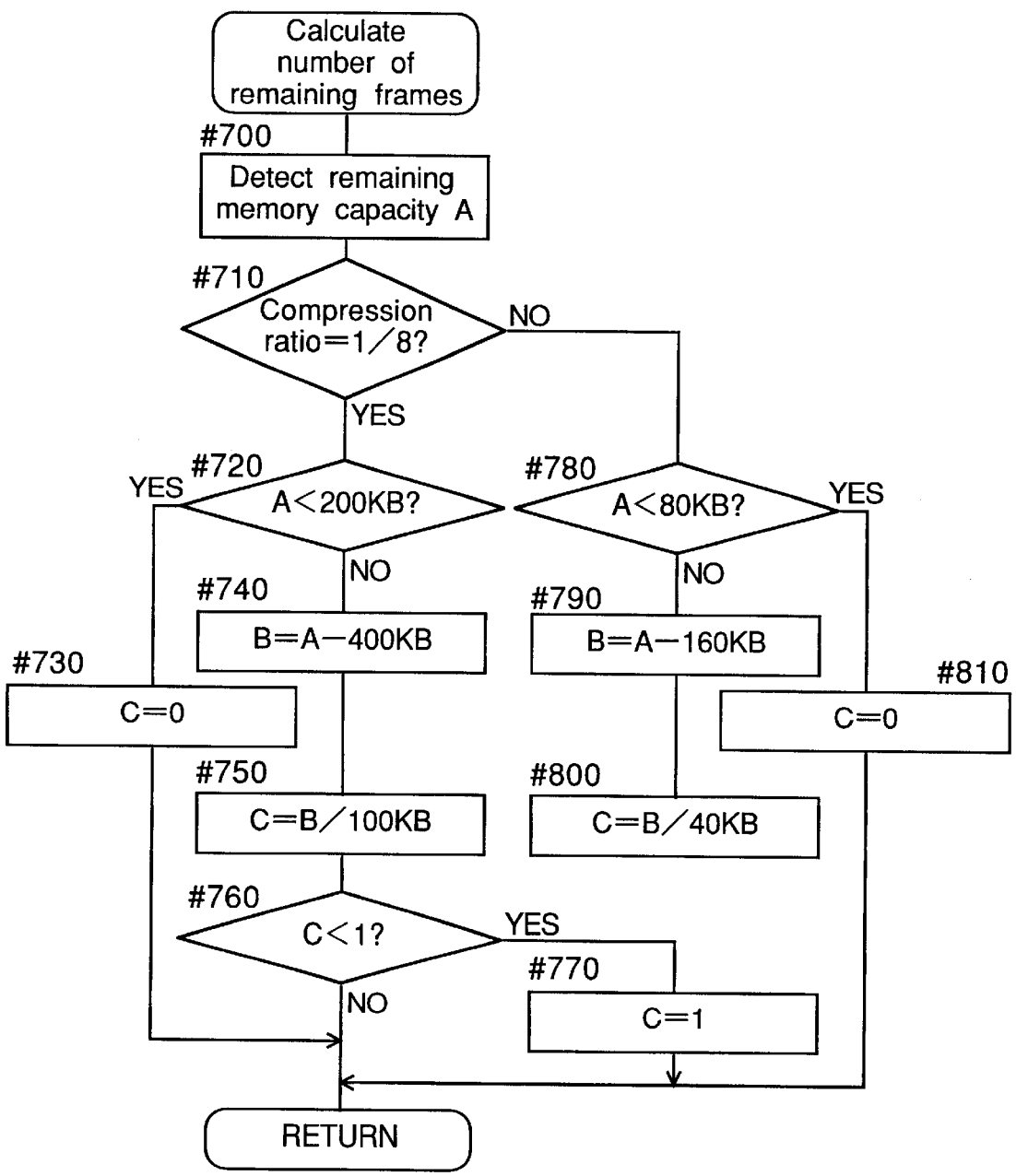
FIG 19 is a flowchart of calculation of remaining frames.

FIG. 19 is a flowchart of calculation of remaining frames which can be stored in the IC card. First, the remaining storage capacity "A" of the IC card is detected (step #700). Next, the selected compression ratio is decided by the switch SCOMP (step #710). If the compression ratio is decided to be 1/8 (YES at step #710), it is checked further whether the remaining storage capacity is smaller than 200 KB or not (step #720). If the remaining storage capacity is decided to be smaller than 200 KB (YES at step #720), the number "C" of remaining frames is set to zero (step #730). If the remaining storage capacity is decided not to be smaller than 200 KB (NO at step #720), the remaining storage capacity "A" is subtracted by a room of 400 KB (step #740), and the difference is divided by the standard record capacity 100 KB per frame, and the integral part of the quotient is decided to be the number "C" of remaining frames (step #750). If the result "C" is less than one (YES at step #760), the number "C" is set to one (step #770).

On the other hand, if the compression ratio is decided not to be 1/8 (NO at step #710), it is checked further whether the remaining storage capacity "A" is smaller than 80 KB or not (step #780). If the remaining storage capacity is decided to be smaller than 80 KB (YES at step #780), the number "C" of remaining frames is set to zero (step #810). If the remaining storage capacity is decided not to be smaller than 80 KB (NO at step #780), the remaining storage capacity "A" is subtracted by a room 160 KB (step #790), and the difference is divided by the standard record capacity 40 KB per frame, and the integral part of the quotient is decided to be the number "C" of remaining frames (step #800). If the result "C" is less than one (YES at step #760), the number "C" is set to one (step #770).

Figure 20:
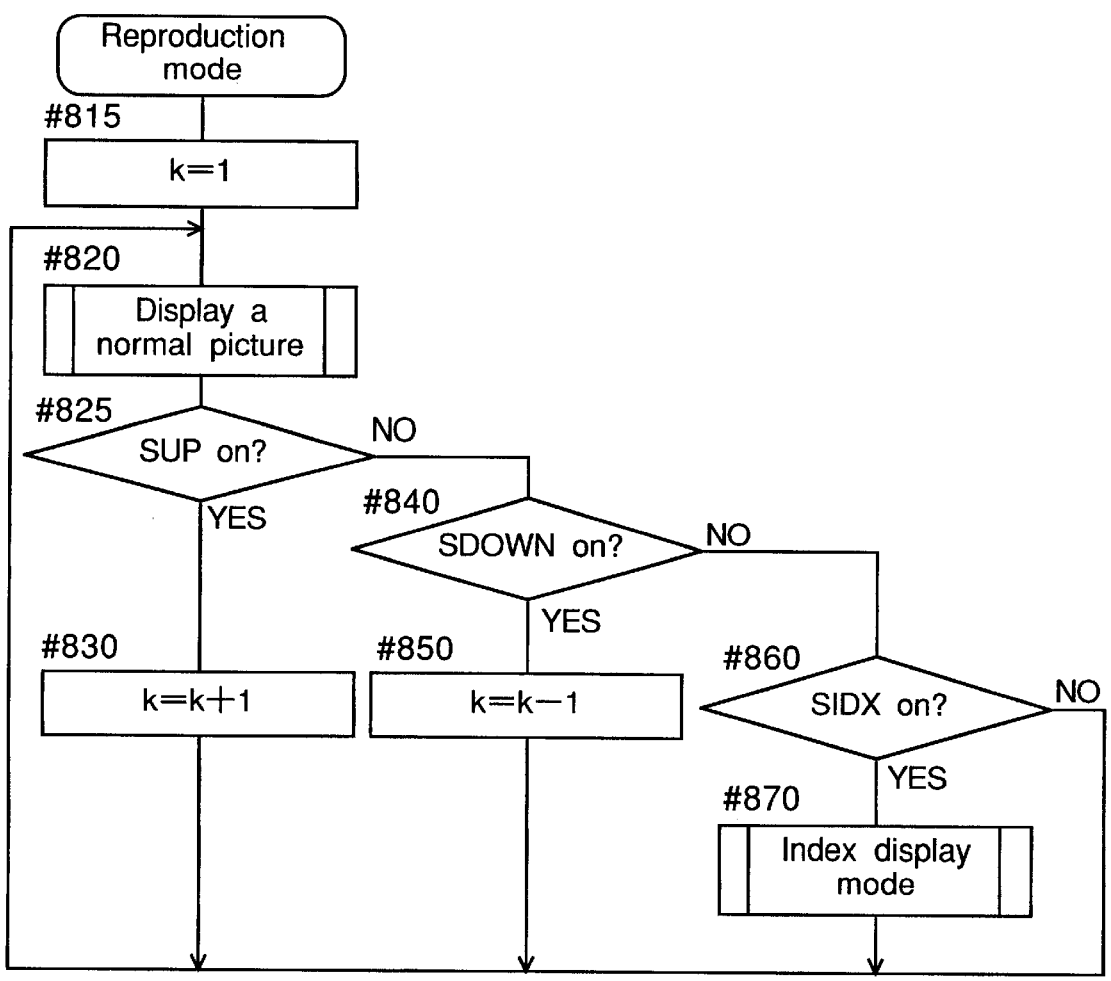
FIG. 20 is a flowchart of reproduction mode.

FIG. 20 is a flowchart of the reproduction mode. First, the reproduction frame number "Ik" is set to one (step #815), and the normal image mode is performed (step #820). Then, it is decided whether the switches SUP, SDOWN or SINDX is turned on or not. If it is decided that the switch SUP is turned on (YES at step #825), the reproduction frame number "k" is incremented by one (step #830), and the flow returns to step #820. If it is decided that the switch SDOWN is turned on (YES at step #840), the reproduction frame number "k" is decremented by one (step #850), and the flow returns to step #820. If it is decided that the switch SIDX is turned on (YES at step #860), the index display mode is performed (step #870), and the flow returns to step #820.

In a modified example, when the switch SUP is operated in a state where the last frame is displayed, it is controlled not to change the display in the display device or it is controlled to return to the state where the first frame is displayed. In concrete, in the former case, it is decided between steps #825 and #830 whether "k" is the number which represents the last frame or not. If the decision is YES, the flow returns to step #820, while if the decision is NO, the flow goes to step #830. In the latter case, it is also decided between steps #825 and #830 whether "k" is the number which represents the last frame or not. If the decision is YES, "k" is set to one and the flow returns to step #820, while if the decision is NO, the flow goes to step #830.

In this modified example, when the switch SDOWN is operated in a state where the first frame is displayed, it is controlled not to change the display in the display device or it is controlled to display the state where the last frame is displayed. In concrete, in the former case, it is decided between steps #840 and #850 whether "k" is the number (one) which represents the first frame or not. If the decision is YES, the flow returns to step #820, while if the decision is NO, the flow goes to step #850. In the latter case, it is also decided between steps #825 and #830 whether "k" is one which represents the first frame or not. If the decision is YES, "k" is set to the number which represents the last frame and the flow returns to step #820, while if the decision is NO, the flow goes to step #850.

Figure 21:
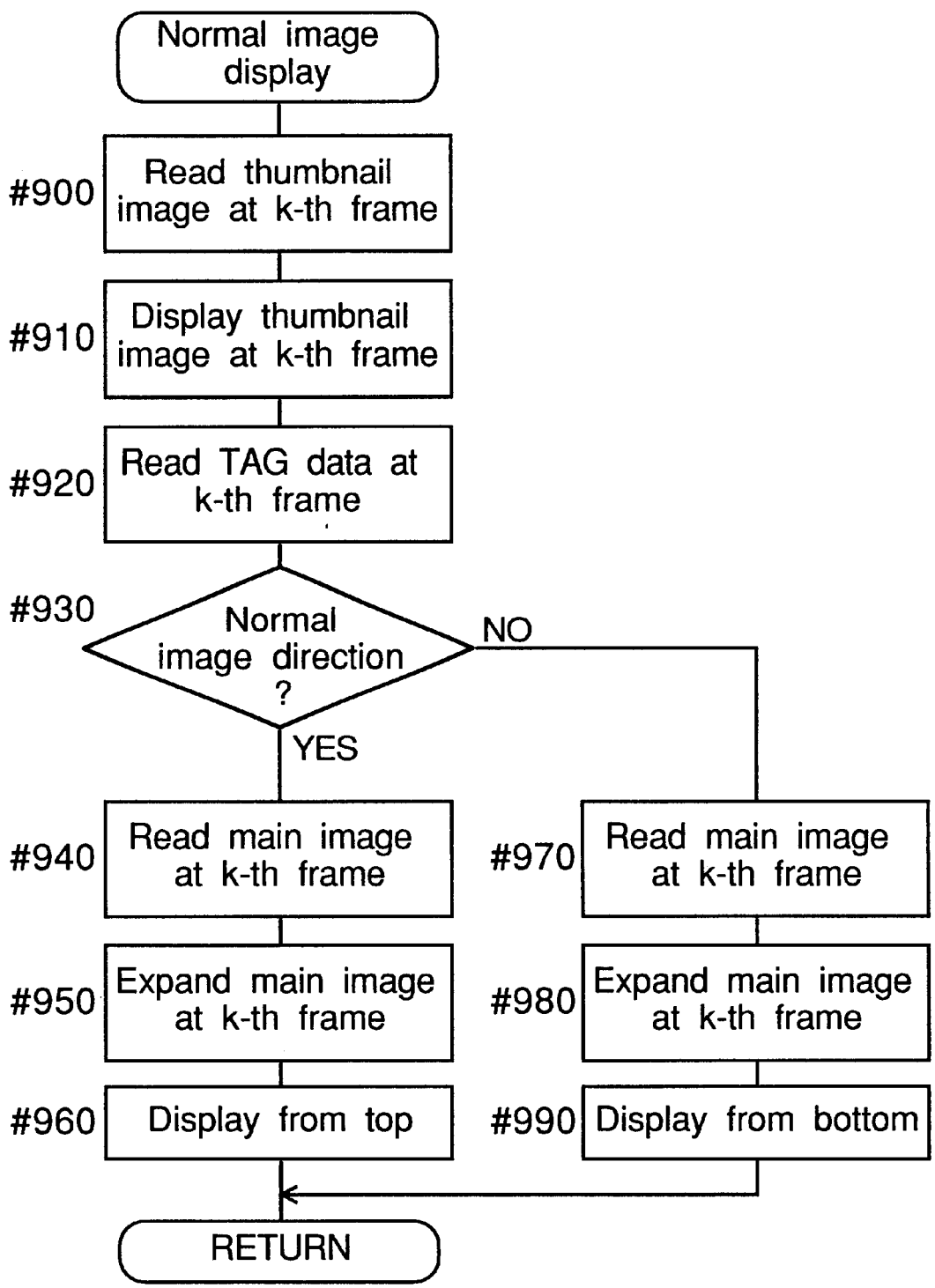
FIG. 21 is a flowchart of normal picture display mode.

FIG. 21 is a flowchart of the normal picture display mode (step #820 in FIG. 20). First, a thumbnail picture at the reproduction frame number "k" is read (step #900), and the thumbnail picture is displayed (step #910). Next, the TAG data of the k-th frame is read (step #920) to determine the direction of the picture. Then, the direction of the picture is decided (step #930). If the direction of the picture is decided to be normal direction (YES at step 930), the main picture at the k-th frame is read (step #940), the main picture is expanded (step #950), and the main picture is displayed from the top of the picture by setting the display data in the memory from a position in correspondence to the top of the display monitor (step #960). On the other hand, if the direction of the picture is decided not to be normal direction (NO at step 930), the main picture at the k-th frame is read (step #970), the main picture is expanded (step #980), and the main picture is displayed from the bottom of the picture by setting the display data in the memory from a position in correspondence to the bottom of the display monitor (step #990).

Figure 22A:
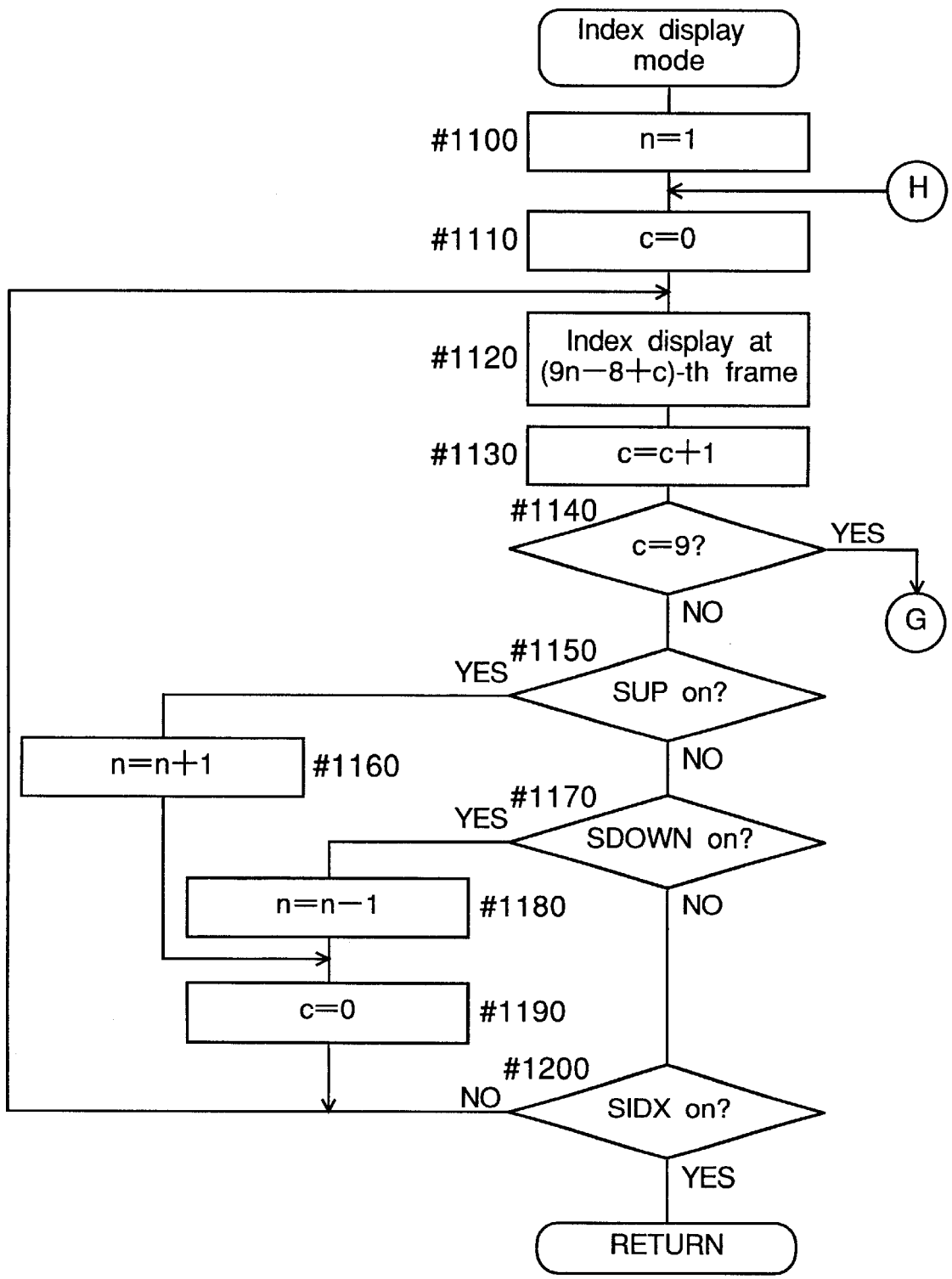
FIGS. 22A and 22B are flowcharts of index display mode.
Figure 22B:
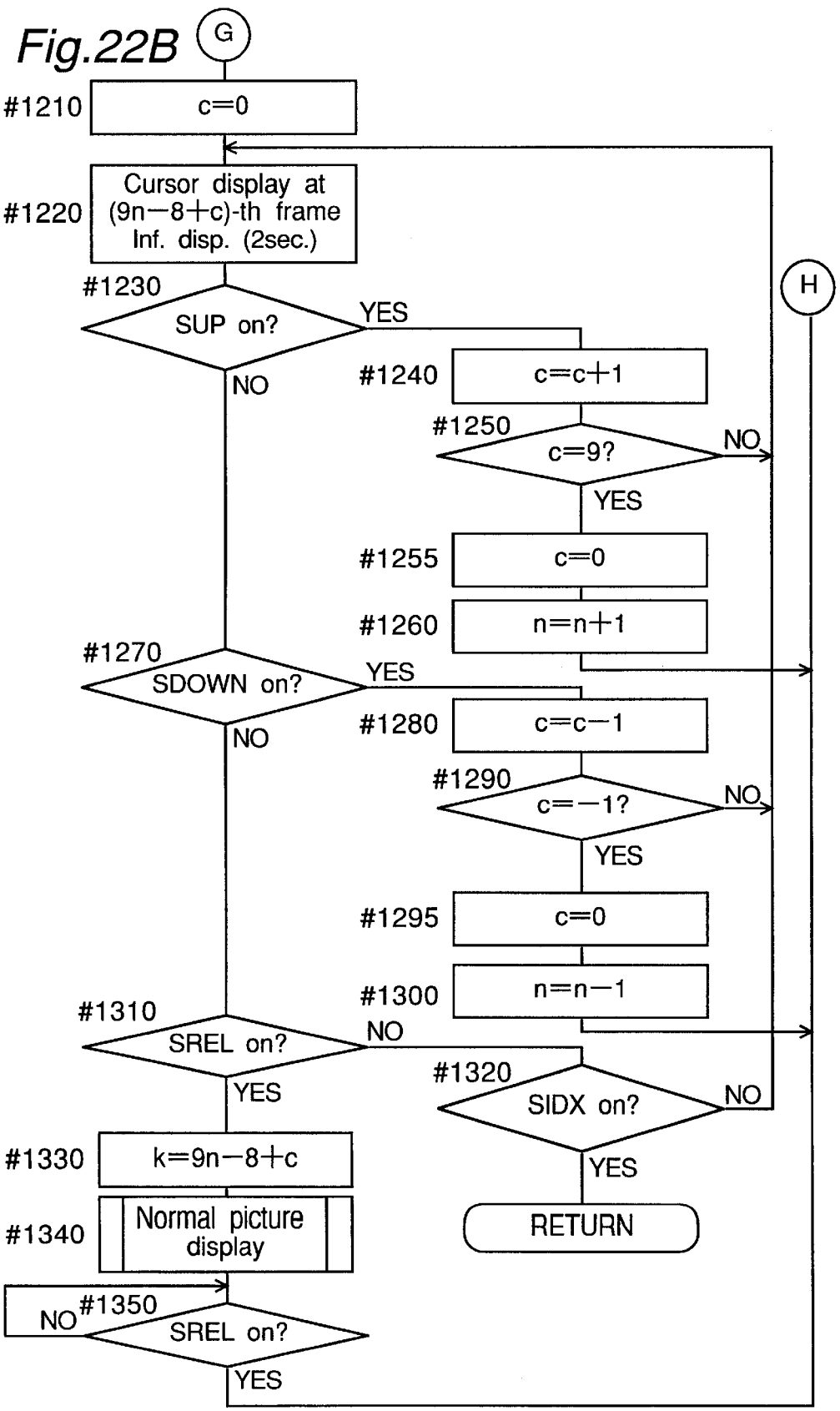

FIGS. 22A and 22B are flowcharts of the index display mode (step #870 in FIG. 20). First, page data "n" is set to one (step #1100). Then, after "c" is set to zero (step #1110), a thumbnail picture at the (9n−8+c)-th frame is read from the IC card and displayed in the LCD device with a size of the screen of the LCD device (step #1120). The thumbnail picture is displayed with a size of ⅑ of the screen. The positions of the thumbnail pictures are represented as 1, 2 and 3 from the left end in the top line, 4, 5 and 6 from the left end in the central line and 7, 8 and 8 from the left end in the bottom line.

Then, "c" is incremented by one (step #1130), and it is decided whether "c" is equal to 9 or not (YES at step #1140). If "c" is decided to be smaller than 9, it is decided whether the switches SUP, SDOWN, and SIDX are turned on (steps #1150, #1170, #1200). If the switch SUP is decided to be turned on, "n" is incremented by one (step #1160), and "c" is reset to zero (step #1190), and the flow returns to step #1120. On the other hand, if the switch SDOWN is decided to be turned on (YES at step #1170), "n" is decremented by one (step #1180), and "c" is reset to zero (step #1190), and the flow returns to step #1120. Therefore, by turning on the switch SUP or SDOWN during the index display, a page can be changed every nine frames.

If the switch SIDX is decided to be turned on (YES at step #1200), the flow returns to the main flow. If no switches SUP, SDOWN, and SIDX are turned on, the flow returns to step #1120. Therefore, in the reproduction mode, the normal display and the index display are exchanged by turning on the switch SIDX.

If "c" is decided to be equal to 9 (YES at step #1140), or if the index display is completed, "c" is reset to zero (step #1210). Then, a cursor image or a thick framework is shown at the (9n−8+c) -th frame (step #1220). At this time, information such as photograph date and title of the picture read from the TAG area is displayed for two seconds so as not to overlap the cursor image.

After the cursor image is shown, it is decided whether the switch SUP or SDOWN is turned on (steps #1230, #1270). If the switch SUP is decided to be turned on, "c" is incremented by one (step #1240). If "c" is decided to be equal to 9 (YES at step #1250), or if the index display is completed, "c" is reset to zero (step #1255), and "n" is incremented by one (step #1260). Then, the flow returns to step #1100 for the next page. On the other hand, if "c" is decided not to be equal to 9 (NO at step #1250), the flow returns to step #1220 to move the cursor image. Further, if the switch SDOWN is decided to be turned on (YES at step #1270), "c" is decremented by one (step #1280). If "c" is decided to be equal to −1 (YES at step #1290), "c" is reset to zero (step #1295), and "n" is decremented by one (step #1300). Then, the flow returns to step #1100 for the previous page. On the other hand, if "c" is decided not to be equal to −1 (NO at step #1290), the flow returns to step #1220 to move the cursor image. Thus, if the switch SUP or SDOWN is turned on in a state where the index display is completed, the cursor position is changed, the information on the cursor image is shown, and the page can be changed every nine frames.

If the two switches SUP and SDOWN are decided not to be turned on, it is decided next whether the switches SREL and SIDX are turned on or not. If the switch SREL is decided to be turned on (YES at step #1310), the reproduction frame number "k" on the reproduced frame is set to (9n−1+c) (step #1330), and the normal image display mode is performed to show the picture at the cursor position normally (step #1340). Then, after the switch SREL is turned on again (YES at step #1350), the flow returns to step #1110.

On the other hand, if the switch SIDX is decided to be turned on (YES at step #1320, the flow returns to the main flow. If the two switches SREL and SIDX are decided not to be turned on, the flow returns to step #1220.

In a modified example, when the switch SDOWN is operated in a state where the cursor is displayed at the first frame (c=0) in the first page (n=1), the display in the display device 10 is controlled not to be changed. Further, when the switch SUP is operated in a state where the cursor is displayed at the last frame (c=8) in the last page, the display is also controlled not to be changed. In concrete, it is decided between steps #1250 and #1255 whether "n" is the number which represents the last page or not. If the decision is YES, "c" is set to eight and the flow goes to step #1270, while if the decision is NO, the flow goes to step #1255. On the other hand, it is decided between steps #1290 and #1295 whether "n" is the number (one) which represents the first page or not. If the decision is YES, "c" is set to zero and the flow goes to step #1310, while if the decision is NO, the flow goes to step #1295.

In a still modified example, when the switch SDOWN is operated in a state where the cursor is displayed at the first frame (c=0) in the first page (n=1), the display device is controlled to display the last page. In this case, the cursor may be shown in the first frame (c=0) or in the last frame (c=8). In this example, when the switch SUP is operated in a state where the cursor is displayed at the last frame (c=8) in the last page, the display device is controlled to display the first page, and the cursor is displayed at the first frame (c=0).

In concrete, it is decided between steps #1255 and #1260 whether "n" is the number which represents the last page or not. If the decision is YES, "n" is set to one and the flow returns to step #1110, while if the decision is NO, the flow goes to step #1260. Further, it is decided between steps #1295 and #1300 whether "n" is the number (one) which represents the first page or not. If the decision is YES, "n" is set to the number which represents the last page and the flow returns to step #1110. The cursor is displayed in the first frame in this case. When "c" is set to eight while "n" is set to the number which represents the last page, the cursor is displayed at the last frame. In either case, if the decision is NO, the flow goes to step #1300.

It is to be noted that the "last frame" represents the ninth frame in one page. However, all the nine frames do not necessarilily have pictures in the last page. For such last page, it is possible to control the display device so as to display the cursor only in the frames having pictures.

IF the total number of the pictures in one page is smaller than nine (for page number of one), the cursor is moved only in the same page by an operation.

Figure 23:
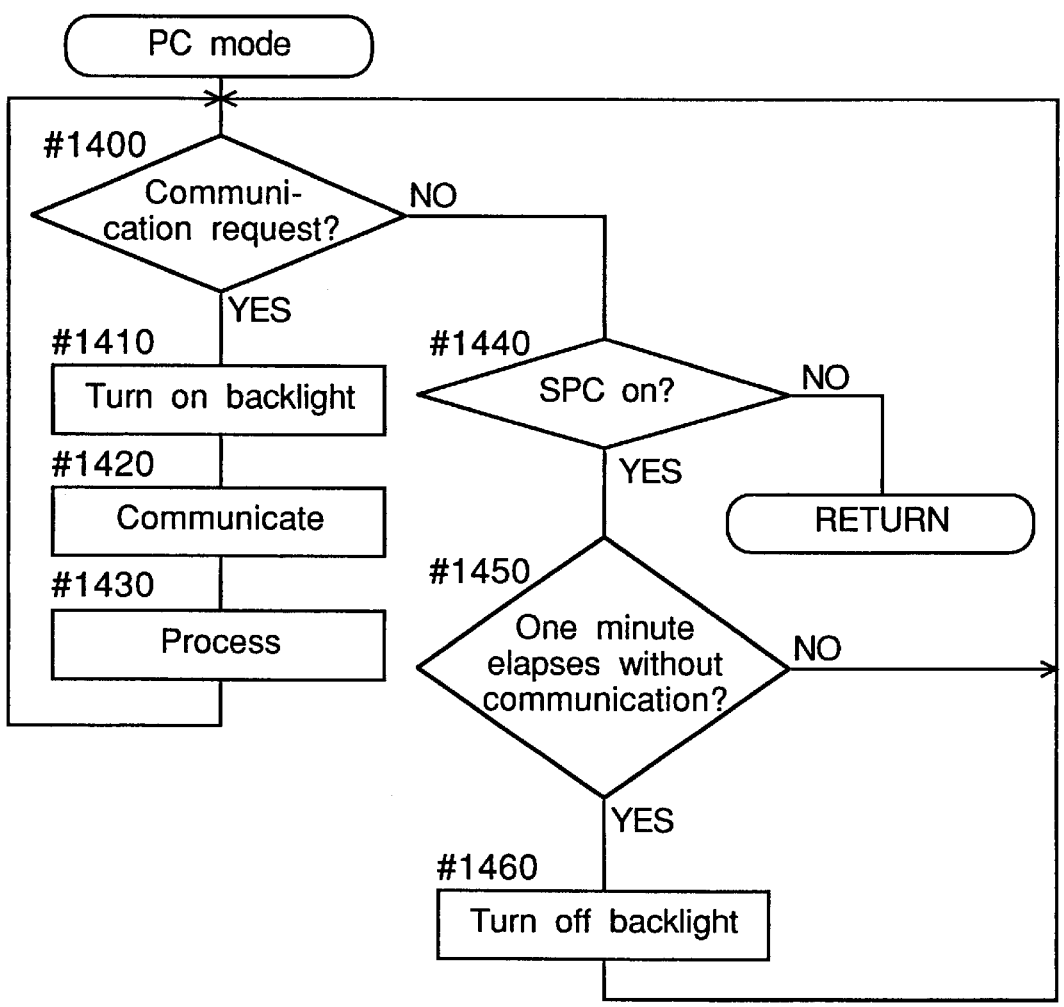
FIG. 23 is a flowchart of PC mode.

FIG. 23 is a flowchart of the PC mode (step #150 in FIG. 17). It is waited to receive a communication request from the computer. If a communication request is decided to be received (YES at step #1400), the backlight for the display monitor 10 is turned on (step #1410), the communication is performed (step #1420), and the processing based on the communication such as image data transmission is processed (step #1430).

If a communication request is decided not to be received (NO at step #1400), it is decided next whether the switch SPC is set or not (step #1440). If the switch SPC is decided not to be set, that is, if the connection cable for the computer is not connected to the digital camera (step #1440), the flow returns readily. On the other hand, though the switch SPC is decided to be set, no communication is received for one minute after the last communication (YES at step #1450), the backlight is turned off for saving the electric power (step #1460), and the flow returns to step #1400 to wait a communication request.

In this embodiment, the digital camera enters to the PC mode by detecting the connection of the cable to the digital camera with the switch SPC. In a modified example, the communication with the computer is monitored periodically, and when the data transmission from the computer is detected actually, the digital camera enters to the PC mode. In this example, if data transmission are not performed for a predetermined time, say three minutes, the digital camera may return to other modes.

As explained above, in a digital camera, a photographer can take a picture of the photographer himself or herself by rotating the camera to the side of the LCD device. When a picture is taken while rotating the camera to the side of the LCD device, the picture data obtained by the image pickup section is reversed upside down to display the picture normally in the monitor, while it is recorded without reversal in an IC card 35. Thus, the picture can be taken and recorded at a fast speed without using an expensive and complicated circuit.

Though the above-mentioned embodiment is explained on the still camera. However, the invention can also be applied to a camera which can take a movie.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera comprising:

a camera main body;

an image pickup device having an optical system for taking a picture and being rotatable relative to said camera main body;

a display device mounted to said camera main body and displaying an optical image of the picture taken by said image pickup device;

a storage device which stores the picture taken by said image pickup device together with a thumbnail picture of the picture as image signals in a recording medium;

a detector which detects a direction of said image pickup device; and a controller which controls said display device to change display direction of the picture to be displayed in said display device and controls said storage device to store the picture and the thumbnail picture thereof by changing the direction of the thumbnail picture when said detector detects that the optical axis of said image pickup device is directed to a position wherein said display device can be observed.

2. A camera according to claim 1, wherein said display device is provided at a rear side of said camera main body and said controller reverses the display direction of the picture displayed in said display section upside down when said detector detects that the image pickup section is directed to a back side relative to said camera main body.

3. A camera according to claim 1, wherein said image pickup section comprises an image pickup element which converts the picture of an object focused by the optical system of the image pickup section to the image signals.

4. A camera according to claim 1, wherein said image pickup section is detachable from said camera main body, and said image pickup section can communicate with said camera main body in a state wherein said image pickup section is detached from said camera, main body.

5. A camera according to claim 4, wherein said controller inhibits to change the display direction of the picture displayed in said display section irrespective of a result of detection by said detector when said image pickup section communicates with said camera main body in a state wherein said image pickup section is detached from said camera main body.

6. A camera according to claim 1, wherein said controller controls said storage device to store the thumbnail picture by changing the display direction of the thumbnail picture when said detector detects that the optical axis of said image pickup device is directed to a position wherein said display device can be observed.

7. A camera comprising:

a main body;

an image pickup device having an optical system for taking a photograph, being rotatable relative to said main body, being detachable from said main body, and able to communicate with said main body in a state detached from said main body;

an image memory, which temporarily stores image data for displaying a picture taken by said image pickup device;

a display device mounted to said main body at a rear side thereof for displaying the picture based on the image data temporarily stored in said image memory;

a storage device which stores the picture taken by said image pickup device as image signals in a recording medium;

a detector which detects a direction of said image pickup device; and a controller which carries out control so as to reverse display direction of the picture displayed in said display device upside down by setting the image data in said image memory so as to reverse the picture upside down when said image pickup device is connected to said main body and said detector detects that the optical axis of said image pickup device is directed to a back side relative to said main body, controls said display device by setting the image data in said image memory as received to display the picture irrespective of the direction of said image pickup device when said image pickup device communicates with said main body in a state detached from said main body, and controls said storage device to store the image signals of the picture irrespective of the direction of the image pickup device and a state of attachment and detachment of said image pickup device to said main body, wherein said controller controls said storage device to store a thumbnail picture by reversing the direction of the thumbnail picture upside down when said image pick up device is connected to said camera main body and said detector detects that the optical axis of the image pickup device is directed to a back side relative to said camera main body.

8. A camera according to claim 7, wherein said image pickup device comprises an image pickup element which converts an image of an object focused by the optical system of the image pickup device to the image signals.

9. A camera according to claim 7, wherein said storage device stores the picture and a thumbnail picture thereof in the recording medium.

10. A camera comprising:

a camera main body;

an image pickup device having an optical system for taking a photograph, being rotatable relative to said camera main body, being detachable from said camera main body, being rotatable relative to said camera main body when attached to said camera main body, and able to communicate with said camera main body in a state detached from said camera main body;

a display device mounted to said camera main body at a rear side thereof and displaying a picture taken by said image pickup device;

a storage device which stores the picture taken by said image pickup device as image signals in a recording medium;

a detector which detects a direction of said image pickup device; and a controller which controls said display device to reverse display direction of the picture displayed in said display device upside down when said image pickup device is connected to said camera main body and said detector detects that the optical axis of said image pickup device is directed to a back side relative to the camera main body, controls said display device to display the picture irrespective of the direction of said image pickup device when said image pickup device communicates with said camera main body in a state detached from said camera main body, and controls said storage device to store the image signals of the picture irrespective of the direction of the image pickup device and a state of attachment and detachment of said image pickup device to said camera main body, wherein said storage device stores the picture and a thumbnail picture thereof in the recording medium, and wherein said controller controls said storage device to store the thumbnail picture by reversing the direction of the thumbnail picture upside down when said image pickup device is connected to said camera main body and said detector detects that the optical axis of said image pickup device is directed to a back side relative to said camera main body.

11. A digital camera comprising:

a camera main body which processes and records image signals;

an image sensor which senses and converts an optical image of an object to the image signals with photoelectric conversion;

a display device which displays the optical image of the object taken by said image sensor;

a processor which produces image signals of a thumbnail image from the converted image signals;

a storage device which stores image signals of the optical image of the object taken by said image sensor together with the image signals of the thumbnail image;

a detector which detects whether a sensing direction of said image sensor agrees with a display direction of said display device; and a controller which controls said display device to display the image signals taken by said image sensor upside down and controls said storage device to store the image signals of the object image and the thumbnail image thereof by changing the direction of the thumbnail image upside down when the sensing direction of said image sensor detected by said detector agrees with the display direction of said display device.

* * * * *

UNITED STATES PATENT AND TRADEMARK OFFICE
CERTIFICATE OF CORRECTION

PATENT NO. : 6,630,958 B2
DATED : October 7, 2003
INVENTOR(S) : Toshiyuki Tanaka et al.

It is certified that error appears in the above-identified patent and that said Letters Patent is hereby corrected as shown below:

Column 1,
Lines 13 and 14, delete "9-957/1997filed", and insert -- 9-957/1997 filed --.

Column 2,
Lines 13 and 14, delete "in which, and replace with the following:", and insert -- in which: --.
Line 15, after "FIG. 1", delete ",".
Line 35, after "sensor", insert -- ; --.
Line 54, after "FIG", insert -- . --.
Line 56, after "mode", delete ",", and insert -- ; --.

Column 5,
Line 29, delete "thereofThus", and insert -- thereof. Thus --.
Line 43, after "205", insert -- . --.

Column 16,
Line 40, after "camera", delete ",".

Signed and Sealed this

Fifteenth Day of June, 2004

JON W. DUDAS
*Acting Director of the United States Patent and Trademark Office*